(12) United States Patent
Grover et al.

(10) Patent No.: US 7,398,520 B2
(45) Date of Patent: Jul. 8, 2008

(54) EFFICIENT CONSTRUCTION OF PRUNED SSA FORM

(75) Inventors: Vinod K. Grover, Mercer Island, WA (US); Weiping Hu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/863,000

(22) Filed: Jun. 7, 2004

(65) Prior Publication Data

US 2005/0273777 A1 Dec. 8, 2005

(51) Int. Cl.
*G06F 9/45* (2006.01)

(52) U.S. Cl. ...................... 717/144; 717/140
(58) Field of Classification Search ............. 717/151, 717/156, 157, 133, 140, 143, 144, 146
See application file for complete search history.

(56) References Cited

U.S. PATENT DOCUMENTS

| | | | | |
|---|---|---|---|---|
| 5,448,737 A * | 9/1995 | Burke et al. | ............... | 717/146 |
| 5,659,754 A * | 8/1997 | Grove et al. | ............... | 717/158 |
| 5,768,596 A * | 6/1998 | Chow et al. | ............... | 717/154 |
| 6,026,241 A * | 2/2000 | Chow et al. | ............... | 717/152 |
| 6,151,706 A * | 11/2000 | Lo et al. | ............... | 717/155 |
| 6,182,284 B1 * | 1/2001 | Sreedhar et al. | ............... | 717/146 |
| 6,427,234 B1 * | 7/2002 | Chambers et al. | ............... | 717/140 |
| 6,571,387 B1 * | 5/2003 | Chow et al. | ............... | 717/156 |
| 6,738,967 B1 * | 5/2004 | Radigan | ............... | 717/146 |
| 2004/0098710 A1 * | 5/2004 | Radigan | ............... | 717/144 |
| 2005/0166194 A1 * | 7/2005 | Rubin et al. | ............... | 717/151 |
| 2006/0070050 A1 * | 3/2006 | Chen | ............... | 717/151 |

OTHER PUBLICATIONS

Cooper, Keith, Simpson, L. Taylor, Vick, Christopher A.. "Operartor Strength Reduction." ACM Transaction on Programming Languages and Systems 23 No. 5(2001): 603-623.*
Kaplan, Adam, Brisk, Philip, Kastner, Ryan. "Data Communication Estimation and Reduction for Reconfigurable Systems." Annual ACM IEEE Design Automation Conference (2003): 616-621.*
Ron Cytron, Jeanne Ferrante, Barry K.Rosen, Mark N. Wegman, and F. Kenneth Zadeck. "An efficient method for computing static single assignment form", Annual ACM Symposium on Principles of Programming Languages, 16(1989): 25-35.*

(Continued)

*Primary Examiner*—Wei Zhen
*Assistant Examiner*—Matthew J Brophy
(74) *Attorney, Agent, or Firm*—Klarquist Sparkman, LLP

(57) ABSTRACT

Intermediate representations of computer code are efficiently generated. More particularly, methods described herein may be used to construct a static single assignment representation of computer code without unnecessary phi-function nodes. Potentially necessary phi-function node assignments may be analyzed to determine whether they directly reach a non-phi use or a necessary phi-use of a corresponding variable. Those that ultimately reach such a use may be determined to be necessary and a pruned static single assignment may be constructed by including those potentially necessary phi-functions determined to be in fact necessary. Also, some phi-function nodes may be determined to be necessary based on their dependency relationship to other phi-functions previously determined to be necessary (e.g., because they directly reach a non-phi use). A phi-function dependency graph may be used to record dependency relationships between phi-function nodes. The analysis can proceed during a forward walk of a control flow representation of the program.

17 Claims, 30 Drawing Sheets

OTHER PUBLICATIONS

Automatic Construction of Sparse Data Flow Evaluation Graphs, Jong-Deok Choi, Ron Cytron and Jeanne Ferrante, In *Conference Record of the 20th Annual Association of Computing Machinery Symposium on Principles of Programming Languages*, 1991, pp. 55-66.

Efficiently Computing Static Single Assignment Form and the Control Dependence Graph, Ron Cytron, Jeanne Ferrante, Barry K. Rosen, Mark N. Wegman and F. Kenneth Zadeck, Association of Computing Machinery, vol. 13, No. 4, Oct. 1991, pp. 451-490.

Practical Improvements to the Construction and Destruction of Static Single Assignment Form, Preston Briggs, Keith D. Cooper, Timothy J. Harvey, and L. Taylor Simpson, Software-Parctioce and Experience, vol. 28, Issue 8, pp. 859-881, Published by John Wiley & Sons, Inc., Jul. 1998.

Efficiently Computing Ø-Nodes On-The-Fly, Ron K. Cytron and Jeanne Ferrante, Association of Computing Machinery, vol. 17, No. 3, May 1995, pp. 487-506.

Single-Pass Generation of Static Single-Assignment Form for Structured Languages, Marc M. Branis and Hanspeter Mössenböck, Association of Computing Machinery, vol. 16, No. 6, Nov. 1994, pp. 1684-1698.

Data Specialization, Todd B. Knoblock and Erik Ruf, Microsoft Research, Advanced Technology Division, Microsoft Corporation, Feb. 5, 1996.

Algorithms for Computing the Static Single Assignment Form, Gianfranco Bilardi and Keshav-Pingali, Association of Computing Machinery, vol. 50, No. 3, May 2003, pp. 375-425.

Characterizing the Optimility of Minimal SSA Using the Value Flow Graph, Hideki Saito, Constantine D. Polychronopoulos, Center for Super Computing Research and Development, University of Illinois at Urbana, Champaign, Jul. 17, 1996.

* cited by examiner

```
┌─────────────────────────────────────────────┐
│ DURING A REACHABILITY WALK OF A CONTROL FLOW│
│ REPRESENTATION OF A COMPUTER PROGRAM,       │──── 406
│ RENAMING THE VARIABLES OF THE ORIGINAL      │
│ PROGRAM TO ENSURE THAT EACH VARIABLE IS     │
│ ASSOCIATED WITH A SINGLE ASSIGNMENT         │
└─────────────────────────────────────────────┘
                      │
                      ▼
┌─────────────────────────────────────────────┐
│ DURING THE SAME REACHABILITY WALK,          │
│ DETERMINING THE NECESSARY PHI-FUNCTION      │
│ NODES AND INCLUDING THE NECESSARY PHI-      │──── 407
│ FUNCTION NODES IN THE SSA FORM OF THE       │
│ CONTROL FLOW REPRESENTATION                 │
└─────────────────────────────────────────────┘
```

FIG. 4C

```
procedure DFS-SSA-Search(current-node, stack)~505
        {
                for the corresponding use of current variable in current-node
                        add-edge(top(stack), current-node); ~525
                        if (!is-phi-node(current-node) || current-node is marked live)~535
                        { mark top(stack) as live } ~530 if (visited(current-node)) ~550
                {
                        return; ~515
                } visited(current-node) = true; ~545
                if (current-node is a def for current variable) {
                        push(current-node, stack);~510
                }
                for each control-flow successor node of current-node
                        DFS-SSA-Search(current-node, stack);~540
                if (current-node is a def for current variable)
                {
                    pop(stack)~520
                };
        }
```

FIG. 5A

```
LiveItems = empty list;
foreach item in live phinodes do
      Add item to LiveItems
end
```

FIG. 5B

```
while LiveItems is not empty do
    remove an item x to LiveItems
foreach p in predecessor of x
    if not live(p) then
        mark p as live
        instantiate node p;
        add p to live items
    end
end
end
```

FIG. 6

| | EDGE SOURCE | EDGE DESTINATION |
|---|---|---|
| 782 | 1 | 6 |
| 781 | 7 | 4 |
| 780 | 6 | 2 |
| 779 | 4 | 6 |
| 778 | 4 | 5 |
| 777 | 3 | 4 |
| 776 | 1 | 2 |

| NODE | INITIALIZED LIVENESS DATA | VIA φ-FUNC. | VIA LIVE-CLOSURE |
|---|---|---|---|
| 0 | Unnecessary | Necessary (5) | |
| 1 | Unnecessary | Necessary (1) ~1041 | |
| 2 | Unnecessary | | |
| 3 | Unnecessary | Necessary (2) ~1042 | |
| 4 | Unnecessary | | |
| 5 | Unnecessary | | |
| 6 | Unnecessary | | Necessary (6) ~1044 |
| 7 | Unnecessary | Necessary (3) ~1043 | |
| 8 | Unnecessary | | |
| 9 | Unnecessary | Necessary (4) | |

```
procedure DFS-SSA-Search(current-node, stacks)
{
            for each var used in current-node add-edge(Top(stacks[var]), current-node);
                if (!is-phi-node(current-node) || current-node is marked
live)

{ mark Top(stacks[var]) as live } if (visited(current-node))
                {
                        return;
                } visited(current-node) = true;
            for each dest-var of current-node do
            {
                Push(current-node, stacks[dest-var])
            }
              for each control-flow successor node of current-node
                    DFS-SSA-Search(node, stacks);

for each dest-var of current-node do
            {
                pop(stacks[dest-var])
            }

| NODE | INITIALIZED LIVENESS DATA | VIA φ-FUNC. | VIA LIVE-CLOSURE |
|---|---|---|---|
| 0 | Unnecessary | Necessary (5) | |
| 1 | Unnecessary | | Necessary (6) |
| 2 | Unnecessary | | Necessary (9) |
| 3 | Unnecessary | Necessary (1) ~1241 | |
| 4 | Unnecessary | Necessary (2) ~1242 | |
| 5 | Unnecessary | | |
| 6 | Unnecessary | | Necessary (8) |
| 7 | Unnecessary | | Necessary (7) ~1244 |
| 8 | Unnecessary | Necessary (3) ~1243 | |
| 9 | Unnecessary | | |
| 10 | Unnecessary | Necessary (4) | |

EFFICIENT CONSTRUCTION OF PRUNED SSA FORM

TECHNICAL FIELD

The technical field relates to software development tools, such as compilers for a computer program.

BACKGROUND

Software compilers use internal data structures (e.g., control flow graphs, data flow graphs, etc.) for maintaining abstract representations of a program being compiled. Among other things, these program representations are used for implementing optimization techniques (e.g., constant propagation, redundancy elimination, etc.). Thus, the form of internal data structure representations of a program can directly influence the power and effectiveness of the various optimization techniques.

More recently, static single assignment (SSA) form and control dependency graphs have been used for representing data flow and control flow of a program in an efficient manner so as to improve the effectiveness of the compiler optimization techniques. In particular, SSA form can be viewed as a sparse representation of the traditional use-definition and definition-use chains related to a program. The SSA form provides several advantages to optimizing compilers. For instance, in SSA form, strict discipline is imposed on the name space used for representing values in computation. Thus, each reference of a name in an SSA form corresponds to the value resulting from precisely a single assignment (this explains the "Single Assignment" in the name SSA). Also, in an SSA form, each use refers to a single name.

Thus, to produce SSA form, a compiler may rewrite the intermediate code representation by inventing new names for each definition and substituting these new names in subsequent uses of the original names. Typically, unique names are created by adding a subscript to the name provided in the original program code. For instance, if a program had a variable "X", then an assignment to the variable in the program's SSA representation may be renamed "$X_1$" whereas another assignment may be renamed as "$X_2$" and so on. Such renaming is simple in the context of straight-line code. However, the presence of more complex control flow presents a challenge for such a renaming process and the interpretation of the resulting code. For instance, if a name in the original code is defined along two converging paths, the SSA form may have multiple names when it reaches a reference.

One way to solve this problem is to introduce a pseudo function (typically referred to as a phi-function, phi-function node, phi-node, ϕ-function, ϕ-function node or ϕ-node) which takes as its arguments the two renamed names converging at the paths and results in a single value being assigned to a new name depending on the control flow. The phi-function can be added into the SSA form where appropriate. For example, a phi-function such as $\phi(X_1, X_2)$ may resolve which value, $X_1$ or $X_2$, applies at a particular convergence path depending on how control flow reached that path (i.e., via the path 1 or 2). A phi-function is sometimes referred to as a "join" function.

Several methods have been proposed for constructing SSA form from the original code related to a program. Each method may result in varying forms of the SSA form with differences in the size of the name space and the number of phi-functions. For instance, Cytron et al. proposes a "minimal" construction for SSA form in their paper titled "*Efficiently computing static single assignment form and the control dependence graph*," (ACM Transactions on Programming Languages and Systems, 13(4), 450-490, 1991). The so-called "minimal" construction inserts a phi-function at every point where a control-flow merge or join point brings together two SSA form names originating from a single name of the original code. However, this method may insert phi-functions that are unnecessary in an SSA form. For example, phi-functions may be inserted to resolve converging paths of a variable that are never used after the merge. Such values are also typically referred to as not being "live."

The so-called "minimal" SSA construction as taught by Cytron et al. relies entirely on the dominance frontier information of the variables of the program, which accurately captures the potential flow of values in a program but ignores the actual facts related to the data-flow. In particular, Cytron et al. ignores any knowledge about the lifetimes of values determined from analyzing their definitions and uses. Because of this, the so-called "minimal" SSA construction method may in fact insert an unnecessary phi-function at a join point or a merge point for a variable that may not be live.

Several proposed methods address the unnecessary phi-functions. For instance, Choi et al. (Jong-Deok Choi, Ron Cytron, and Jeanne Ferrante; "*Automatic Construction of Sparse Data Flow Evaluation Graphs*," Conference Record of the Eighteenth Annual ACM Symposium on Principles of Programming Languages, January 1991) propose a method for generating a pruned SSA form wherein all unnecessary phi-functions may be eliminated from the final SSA form. The method proposed by Choi et al. uses a traditional liveness analysis (e.g., via a backward walk) on the original, yet to be renamed variables in a prepass. In a different pass, Choi's method generates an SSA form relying on the liveness analysis, indicating which variables are live. However, such a process may be inefficient and time consuming because it requires multiple passes over the flow graph to generate a pruned SSA form without any unnecessary phi-functions.

A method of generating a so-called "Semi-Pruned" SSA form has also been proposed. For instance, Briggs et al., propose such a method in "*Practical improvements to the construction and destruction of static single assignment form*," (Software: Practice and Experience, pages 28(8):859-881, 1998). This method proposes a less expensive local liveness analysis for each block of a control flow graph. However, this method does not always remove all the unnecessary phi-function nodes. Thus, there is a need for a method of generating a pruned SSA form which is efficient and accurate.

SUMMARY

Described herein are methods for constructing intermediate representations of computer code. More particularly, described herein are methods for a software development tool to construct efficient SSA forms of computer code by determining which phi-function nodes are necessary. In one aspect, potentially necessary phi-function nodes with assignments that reach a non-phi use of a variable corresponding to the assignment are determined to be necessary and included in an SSA form of the computer code.

In another aspect, other phi-function nodes that are relied on by the phi-function nodes whose assignments reach non-phi uses are also determined to be necessary and included in an SSA form of the computer code. For instance, those phi-function nodes that reach a phi-function node previously determined to be necessary are also determined to be necessary.

Furthermore, in another aspect, a phi-function dependency data structure is constructed to determine whether potentially necessary phi-function nodes may be confirmed to be necessary based on their relationship to other phi-function nodes already confirmed to be necessary. In a further aspect, a pruned SSA form may be constructed during a forward reachability walk of a control flow representation of the original program.

In yet another aspect, the pruned SSA form of a program may be constructed by initially assuming that potentially necessary phi-function nodes having an unkown status (e.g., initially all the nodes) are unnecessary and changing their liveness status upon determining that they are necessary.

Additional features and advantages will be made apparent from the following detailed description of illustrated embodiments, which proceeds with reference to accompanying drawings.

BRIEF DESCRIPTION OF THE FIGURES

FIG. 4C is a flow diagram describing an overall method of constructing a fully pruned form of SSA representation of a computer program.

FIG. 5A is a listing of an exemplary programmatic representation of one method of constructing a phi-function dependency data structure.

FIG. 5B is a listing of an exemplary programmatic representation of one method of recording data indicative of phi-function nodes with a liveness status of necessary.

FIG. 6 is a listing of an exemplary programmatic representation of one method of conducting a live-closure of the phi-function dependency data structure.

FIG. 11 is a listing of an exemplary programmatic representation of one method of constructing a phi-function dependency data structure for a program comprising multiple variables.

DETAILED DESCRIPTION

Exemplary Program Representations

Figure 1A:
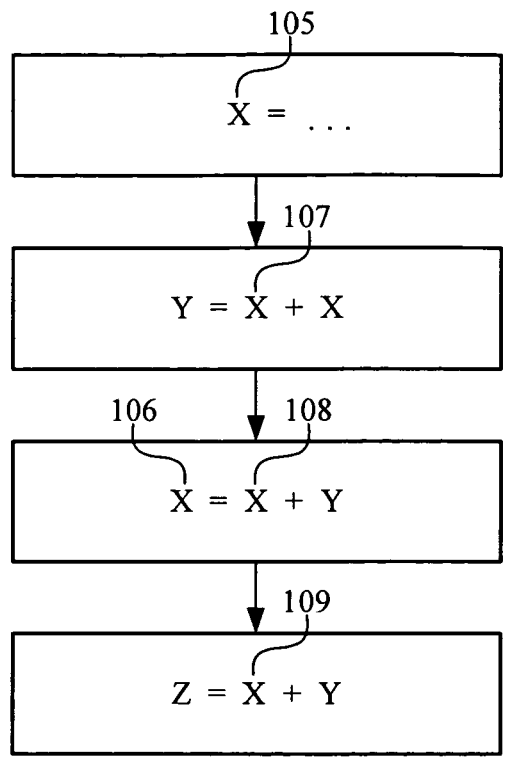
FIG. 1A is a block diagram illustrating an exemplary representation of a computer program.

FIG. 1A illustrates an exemplary straight-line control flow representation of a program comprising multiple variables (e.g., X, Y and Z). As shown in FIG. 1A, the variable X is assigned values at two different points in the control flow (e.g., at 105 and 106), and it is used at multiple different points (e.g., at 107, 108 and 109). A simple viewing of the control flow will allow the inference that the use at 107 and 108 refers to the value for the variable X assigned or defined at 105 whereas the use at 109 refers to the assignment or definition at 106.

Figure 1B:
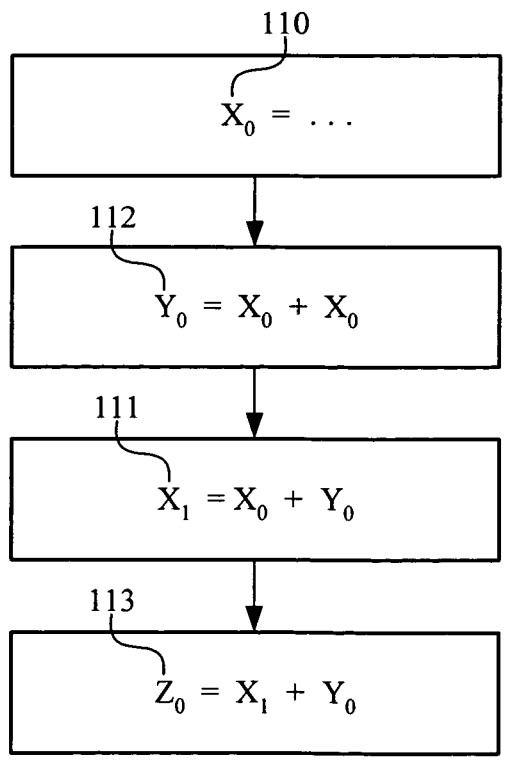
FIG. 1B is a block diagram illustrating an exemplary SSA representation of a computer program.

In an SSA form for the program, the assignments would be explicit such that no inference would be needed. Thus, as shown in FIG. 1B, in the exemplary SSA form of the program of FIG. 1A, each new assignment to X in the original code of the program would be renamed with a distinct name. For instance, subscripts may be added to the original names to ensure uniqueness. FIG. 1B shows two different names (e.g., $X_0$ at 110 and $X_1$ at 111) for the X variable from the original program whereas both the Y and Z variables each have a single name (e.g., $Y_0$ at 112 and $Z_0$ at 113) because they each have a single assignment in the control flow. Thus, as FIGS. 1A and 1B conceptually illustrate, code for a program is said to be in an SSA form, if each name has exactly one definition point and each use refers to exactly one name.

Exemplary Phi-functions in SSA Form

In any of the examples herein, a phi-function can accept two or more parameters. A phi-function is sometimes called a "static single assignment phi-function."

Figure 2A:
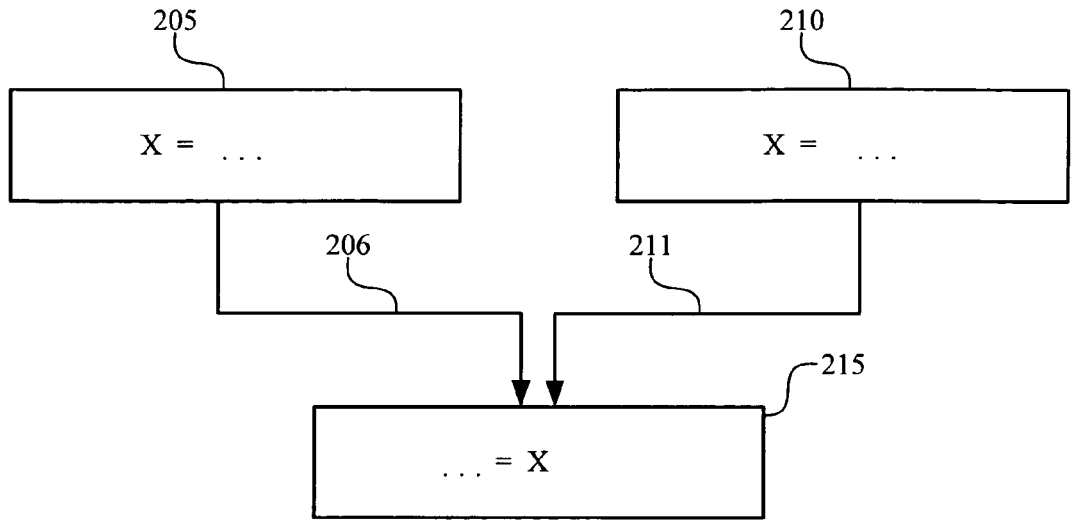
FIG. 2A is a block diagram illustrating an exemplary representation of a computer program comprising a merge point wherein two different assignments to the same variable may need to be resolved.

Ensuring that each use refers to exactly one name becomes more challenging as control flows become more complex. In particular, if a named variable in original code is defined along two different but converging paths, the SSA form of the code would have two different names and possibly two different values assigned for each of the names depending on the chosen control flow path. FIG. 2A illustrates this scenario wherein assignments at 205 and 210 converge at the merge point 215, which shows a use of X. Thus, which value assigned to X is to be used at 215 may be resolved depending on the flow path chosen (e.g., 206 or 211).

Figure 2B:
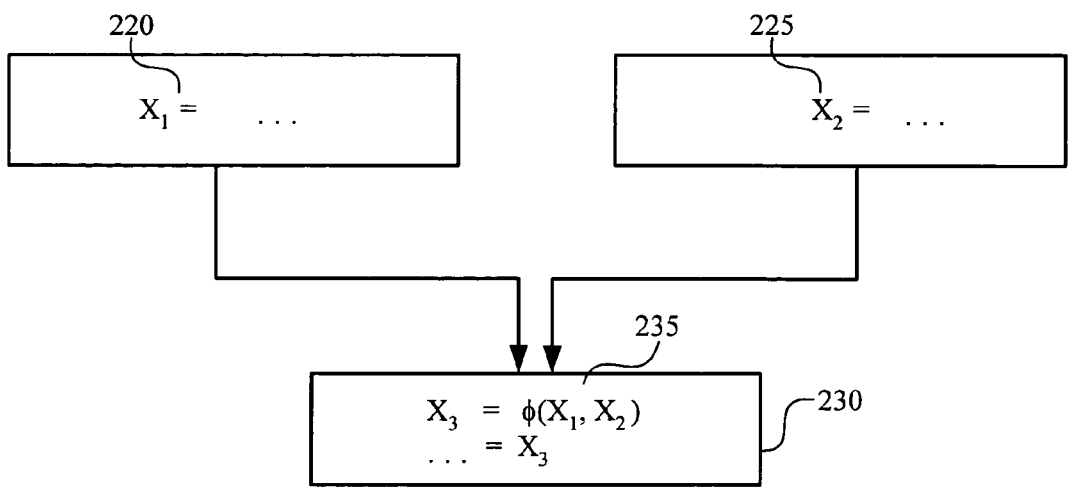
FIG. 2B is a block diagram illustrating an exemplary representation of a computer program comprising a merge point wherein two different assignments to the same variable may be resolved by the use of a phi-function.

In an SSA form (FIG. 2B) related to the control flow of FIG. 2A, the variable X may be renamed $X_1$ at 220 and $X_2$ at 225 the value used at 230 may be resolved by a phi-function such as $\phi(X_1, X_2)$ at 235. A phi-function is at once an assignment and also use of one or more variables.

Exemplary Unnecessary Phi-functions

However, a phi-function is not necessary at every merge point or join point. For example, a phi-function placed at a merge point may involve a variable for which there is no subsequent use. Such a phi-function is not live (and is therefore unnecessary) and need not be included in SSA form of the program. In any of the examples herein, those phi-functions determined to be live can be considered to be necessary, and those that are determined to not be live (dead) can be considered to be unnecessary.

Figure 3A:
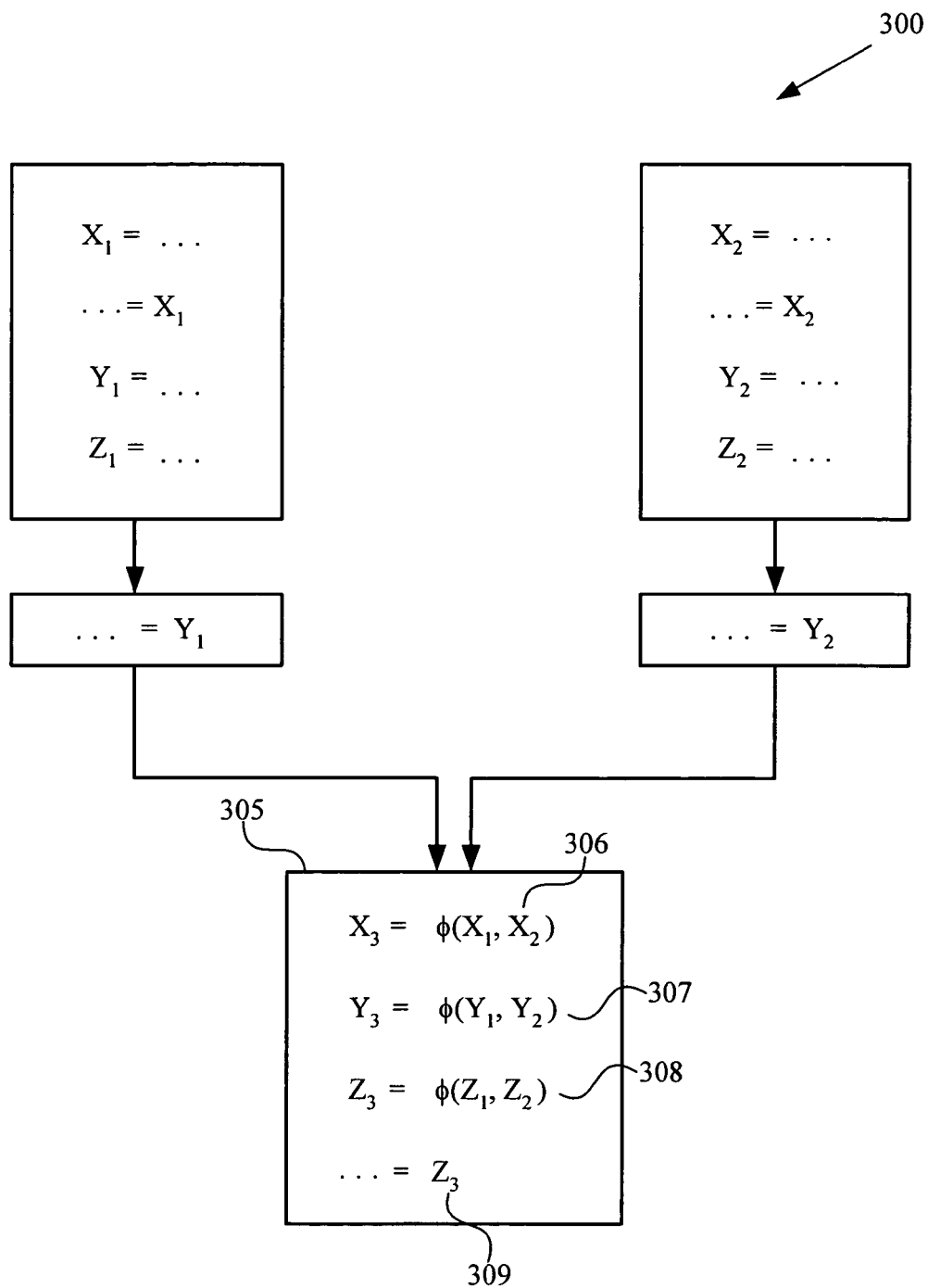
FIG. 3A is a block diagram illustrating an exemplary unpruned minimal SSA representation of a computer program comprising unnecessary phi-function nodes.

Some other phi-functions may be necessary (e.g., they may involve a variable for which there is a subsequent use). For instance, the phi-function at 235 in FIG. 2B may be necessary since there was a use of the variable X at the merge point node 230 without an intervening assignment that supersedes the previous assignments at 220 and 225. FIG. 3A illustrates phi-functions that are unnecessary. For instance in the SSA form 300 of FIG. 3A, at the merge point 305, two different values for the variables X, Y, and Z of the original code may be available and renamed as $X_1, X_2, Y_1, Y_2, Z_{1\ and\ Z2}$ respectively. However, for the control flow illustrated in FIG. 3A, the phi-functions at 306 and 307 are unnecessary since, as illustrated in FIG. 3A, there is no subsequent use of the variables X or Y in the control flow of the program. However, the phi-function at 308 for the variable Z in the original program now renamed $Z_{1\ and\ Z2}$ is necessary since there is a use of the variable Z at 309 whose value may need to be resolved via the phi-function $\phi(Z_1, Z_2)$ at 308.

Some methods of generating an SSA-form cannot make the distinction between necessary and unnecessary phi-functions and thus, may place them at all merge points. For instance, the so-called "minimal" construction taught by Cytron et al. above is one such method.

Exemplary Semi-pruned SSA Form

Figure 3B:
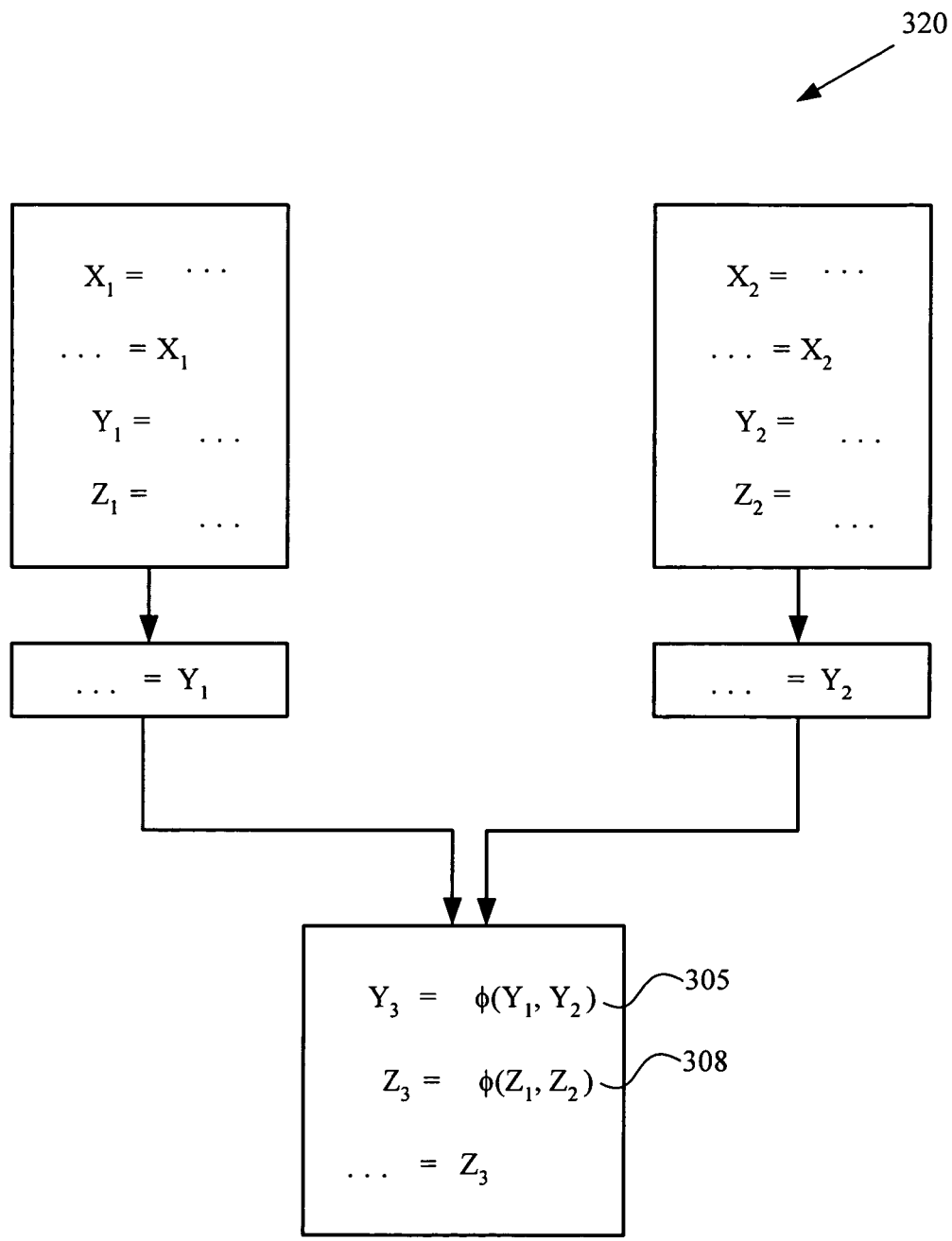
FIG. 3B is a block diagram illustrating an exemplary semi-pruned minimal SSA representation of a computer program with some of the unnecessary phi-function nodes eliminated.

FIG. 3B illustrates a semi-pruned SSA form wherein some of the phi-functions (e.g., 306 of FIG. 3A) are determined to be unnecessary and thus, not instantiated in the final SSA form 320. However, as noted above, the phi-function 305 above related to the variable Y is also unnecessary. But, the methods of generating semi-pruned SSA forms (e.g., the method taught by Briggs et al. described above) rely on a local liveness analysis which may miss eliminating some of the unnecessary phi-functions such as the one at 305 related to the variable Y. As noted above, the phi-function related to variable Y may be removed because there is no non-phi use of the variable subsequent to the merge point in the control flow representation. Thus a phi-function is not needed to resolve which value is to be assigned to the variable Y depending on a chosen path of the control flow representation.

Exemplary Pruned SSA Form

Figure 3C:
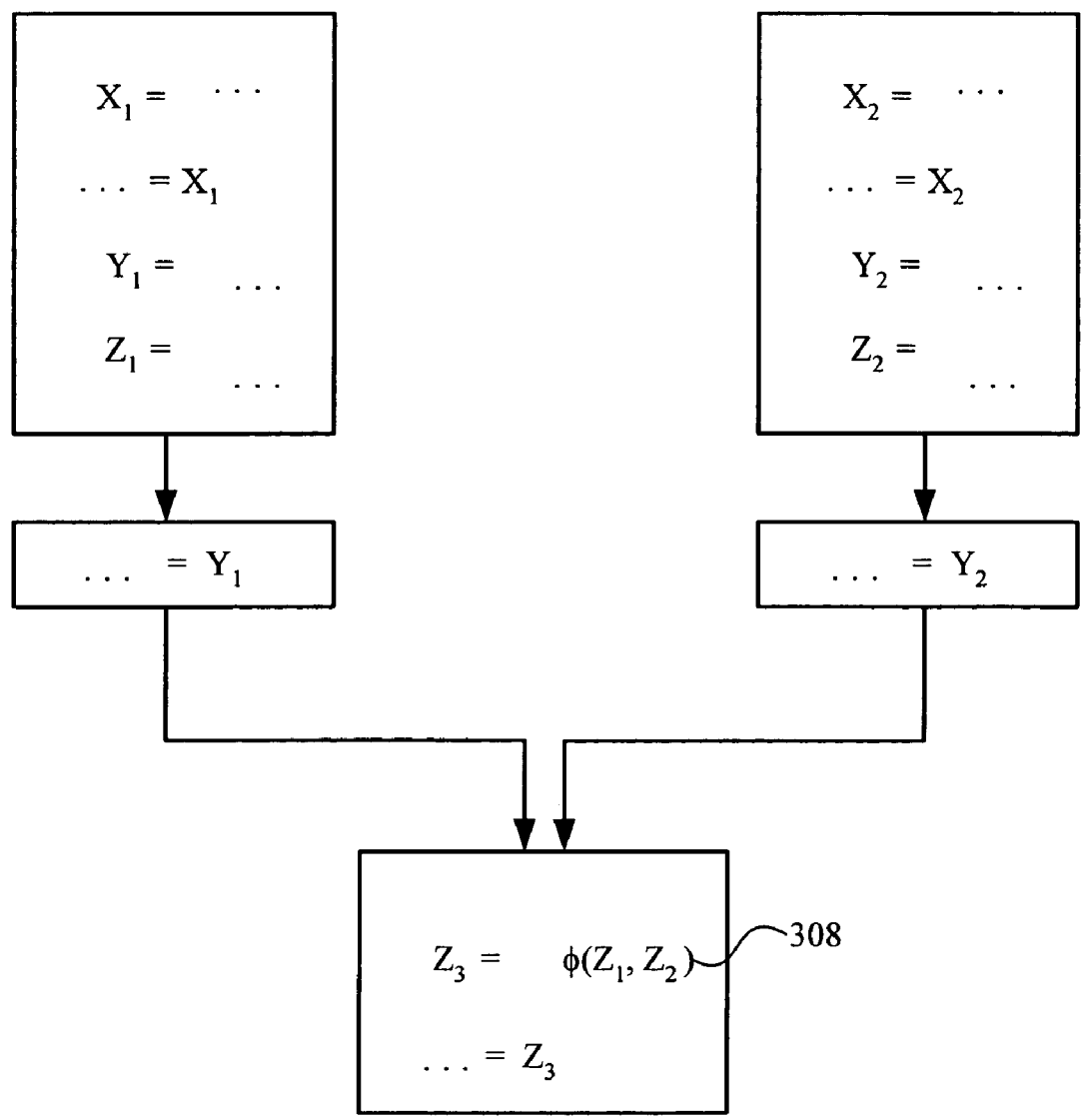
FIG. 3C is a block diagram illustrating an exemplary fully-pruned minimal SSA representation of a computer program with all of the unnecessary phi-function nodes eliminated.

FIG. 3C illustrates a fully pruned SSA form, wherein no unnecessary phi-functions are instantiated in any of the nodes or blocks of the final SSA form. Since the variable Z in the original code is the only variable used after the merge point, a thorough analysis would show that the phi-function at 308 is the only necessary phi-function and hence, would be the only phi-function instantiated in a pruned SSA form. As noted above, some methods such as the one taught by Choi et al.

require a separate pre-pass just for computing the liveness of variables, which may be computationally expensive.

In any of the examples herein, although the terms "prune" or "pruned" are used, a technique need not remove phi-nodes. For example, a technique can determine which phi-nodes to add (e.g., rather than removing them), and still result in an SSA representation that has fewer phi-nodes than an unpruned SSA representation.

Exemplary Programs

As described herein, a program includes any set of software instructions (e.g., a procedure, sub-routines, method, or the like).

Figure 4A:
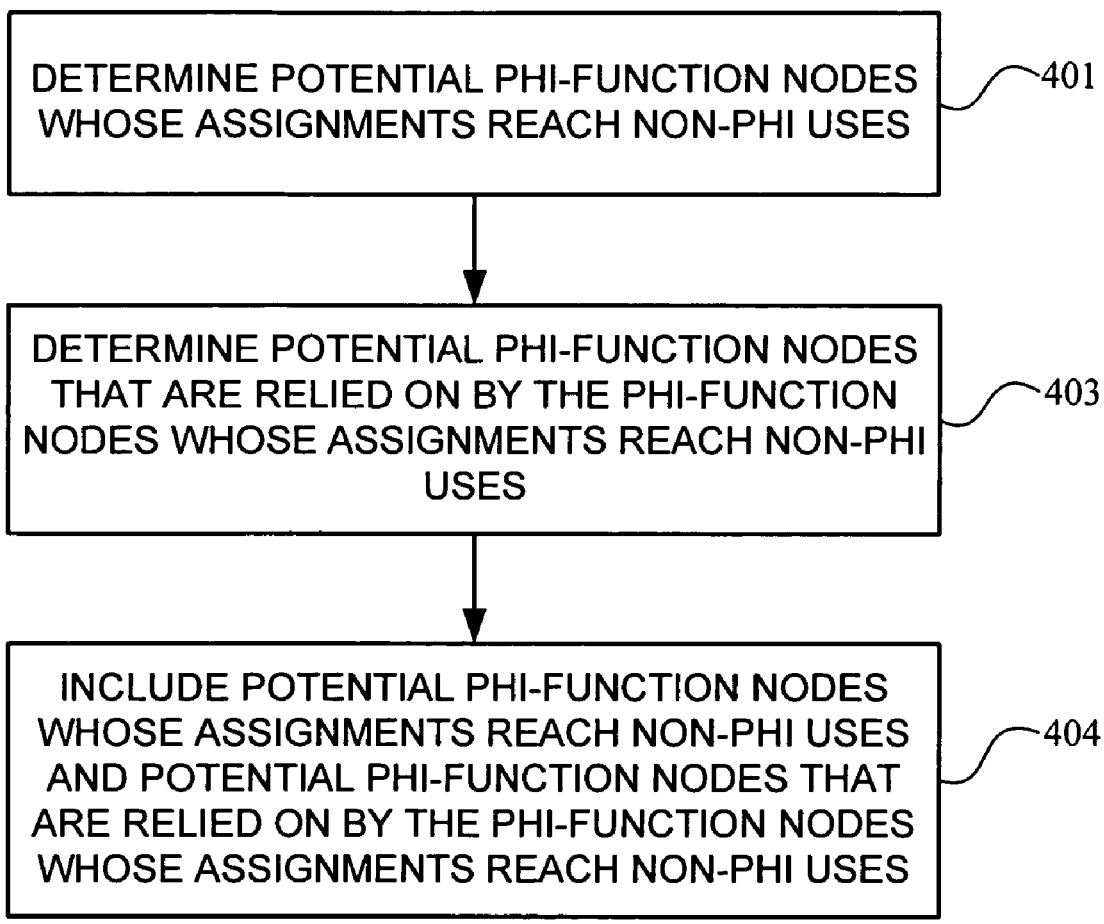
FIG. 4A is a flow diagram describing an overall method for constructing an SSA representation of a computer program including the necessary phi-function nodes.

An Exemplary Overall Method for Generating an SSA Form by Adding Necessary Phi-function Nodes One efficient SSA representation of a program may include just the necessary phi-function nodes. According to the method described in FIG. 4A for constructing such an efficient SSA form, the necessary phi-functions nodes are first identified and included in the SSA form. The actions shown can be practiced using a representation of the program (e.g., a control flow representation of the program). At 401, those phi-function nodes with assignments that reach non-phi uses of the corresponding variable are identified to be necessary. Then at 403, those other phi-functions which are relied on by the phi-function nodes whose assignments reach non-phi uses (e.g., directly) are then also identified to be necessary. At 404, the phi-nodes having assignments reaching non-phi uses and the potential phi-function nodes that are relied on by the phi-function nodes where assignments reach non-phi uses are included in the SSA form representing the program.

Including phi-function nodes in an SSA form may comprise, for example, changing a status or otherwise taking action that results in the phi-function being included in the resulting SSA form. For example, all phi-functions can be assumed to be unnecessary but remain in the SSA form. Subsequently, those that are included (e.g., by changing their status) remain and others are removed.

The methods described herein, can be implemented by computer-executable instructions (e.g., stored in one or more computer-readable mediums).

Figure 4B:
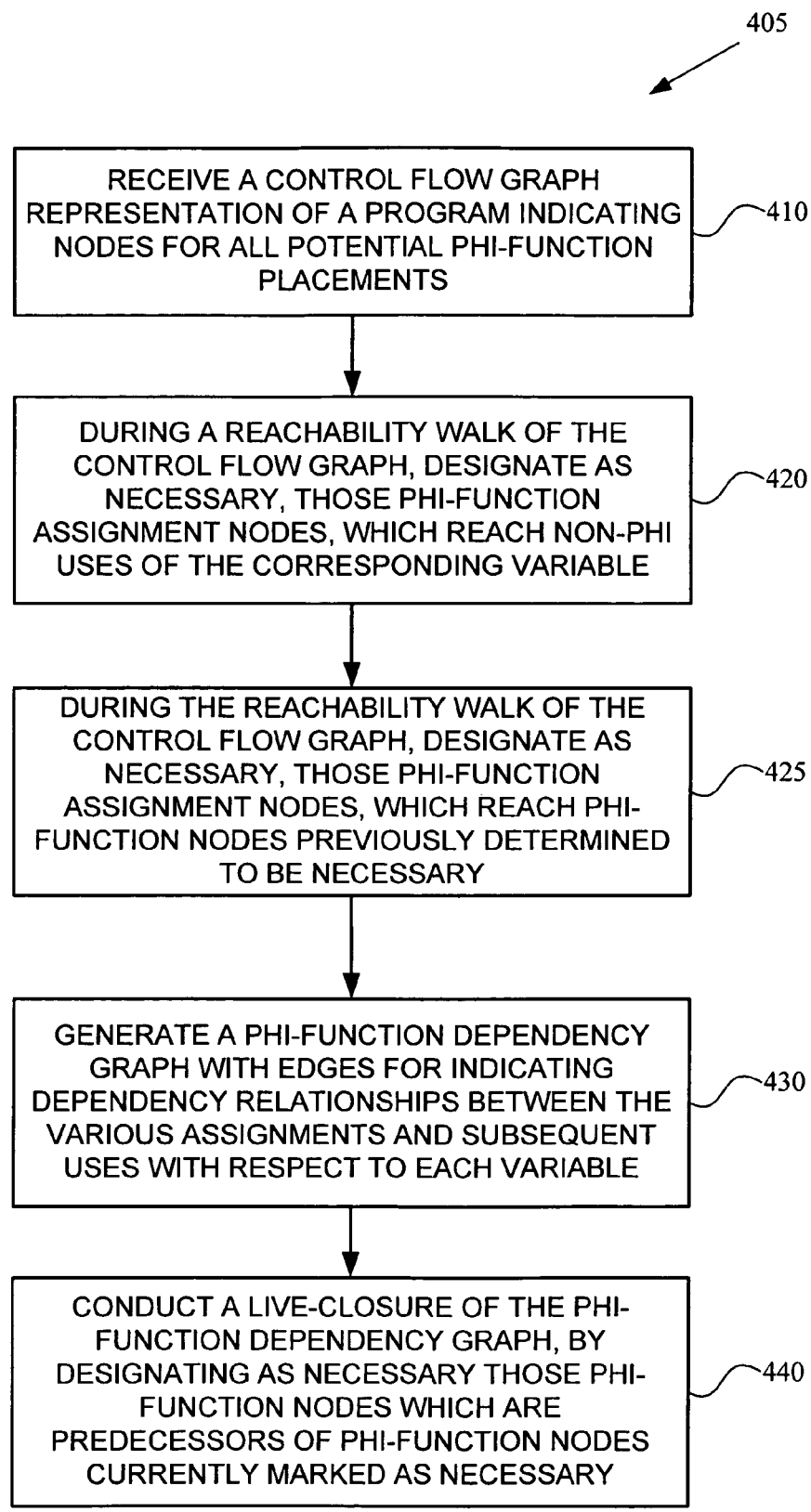
FIG. 4B is a flow chart diagram, describing an overall method for constructing an SSA representation, wherein the variables are renamed and the necessary phi-functions are determined during the same reachability walk.

An Exemplary Detailed Method for Generating a Pruned SSA Form by Determining Unnecessary Phi-function Nodes FIG. 4B illustrates an overall method for constructing a pruned SSA form for a program. At 410, a control flow representation of the code related to the program may be received. Also, as part of this representation or otherwise, indicators of nodes in the control flow representation where potential phi-function nodes may be placed may also be received. For instance, any method for determining the dominance frontiers associated with the program may be used for determining potential placement locations for phi-functions within the SSA form of the program. Later, some of these potential phi-functions may be determined to be not live (and therefore unnecessary) based on the application of the method 405 of FIG. 4B. In any of the examples herein, these phi-functions determined to be live can be considered to be necessary, and those that are determined to not be live can be considered to be unnecessary.

Then at 420, a reachability walk may be conducted on the control flow representation such that its branches and sub-branches are visited at least once for analysis. For instance, one such suitable walk may be a forward reachability walk such as a depth-first walk. Other walks may also be used. At 420, during such a reachability walk, among the potential phi-function assignment nodes that are encountered, it may be determined that at least some of these phi-function assignments or definitions of their respective variables in fact do directly reach non-phi uses (non-phi uses are sometimes referred to as real uses). Such potentially necessary phi-functions whose assignments reach non-phi uses may be marked as necessary and thus, included even in a pruned form of SSA control flow representation. For instance, in FIG. 3A, the expression . . . $=Z_3$ is a non-phi use of the variable Z and thus, the preceding phi-function $Z_3=\phi(Z_1, Z_2)$ would be recognized as a necessary phi-function. Such analysis may be conducted for each program variable (e.g., X, Y, Z, etc.) encountered during the reachability walk.

However, not all phi-function nodes may be determined to be necessary based solely on the direct reachability of their assignments to non-phi uses. Some phi-functions may be determined to be necessary based on their dependency relationships to other phi-functions whose assignments directly reach non-phi uses of their respective variables. Thus, at 425, those phi-function nodes that directly reach other phi-function nodes which were previously determined to be necessary (e.g., because they reach a non-phi use) are also determined to be necessary.

However, depending on the flow of control, some of these dependency relationships may be, several times removed from a successor assignment that in fact reaches a non-phi use. Thus, at 430, during the reachability walk, a phi-function dependency graph may be generated to capture the dependency relationships between the various potential phi-function assignments nodes and any related subsequent phi-function uses of their respective variables in the control flow representation of a program. If need be, a dependency graph may also record relationships between all assignments and their subsequent uses not necessarily just the phi-function nodes.

Later at 440, based on the relationships between the various potential phi-function nodes as established via a phi-function dependency graph, a live-closure procedure may be implemented to determine which of the phi-functions nodes in the phi-function dependency graph are predecessors of phi-function nodes currently determined to be necessary. These phi-functions too then would be determined to be necessary and if these phi-function nodes, newly determined to be necessary, have any other phi-function predecessors they too may be determined to be necessary. Depending on the control flow scenarios, this process may go on further determining liveness in accordance with the dependency chains. Thus, at the end of such a live-closure process for each of the variables of the program the necessary phi-functions are confirmed and conversely, the unnecessary phi-nodes are also known. Later, only those phi-function nodes determined to be necessary may be included in the resulting pruned SSA form with the unnecessary phi-function nodes eliminated.

An Exemplary Method for Generating a Pruned SSA Form by Renaming the Variables and Determining Unnecessary Phi-function Nodes During a Single Reachability Walk A renaming process for constructing an SSA form may comprise identifying the various assignments associated with the variables of the original program and assigning new names for the variables such that each variable name corresponds to a single assignment. For instance, if a program had given a name "X" to a certain variable used in the program then a first assignment to the variable in the program's representation may be renamed "$X_1$" whereas another assignment may be renamed as "$X_2$" and so on.

The above described method for generating a pruned SSA form may also be implemented concurrently with renaming the variables for generating an SSA form. For instance, during the reachability walk described above, any method of renaming variables may be applied to concurrently accord new names to variables as control flow scenarios of assignments and uses unfold during the reachability walk. A separate reachability walk of the original unrenamed control flow representation of the original code of the program is not needed.

Thus, as shown in FIG. 4C at 406 during a reachability walk of the control flow representation of the program the variables may be renamed to ensure single assignment property of the SSA form. While, at 407, during the same walk, the necessary phi-function nodes may be determined to be included in a pruned version of the SSA form.

Exemplary Optimistic Assumptions

In any of the examples described herein, an optimistic assumption can be implemented by initially marking phi-function nodes (e.g., those with unknown status) as unnecessary (e.g., dead).

Exemplary Walks

In any of the example described herein, determining which phi-nodes are necessary can be accomplished via a walk of a control flow representing a program. For example, a single pass through the program is sufficient. Accordingly, a potential phi-node need be visited only once.

An Exemplary Method of Constructing a Pruned SSA Form with the Initial Optimistic Assumption that Phi-function Nodes are Unnecessary or Dead In one exemplary form of the method 400 of FIG. 4B, initially potentially necessary phi-function nodes may be optimistically assumed to be unnecessary and as the analysis of the method of 400 unfolds, those phi-function nodes determined to be necessary may have their liveness status changed to necessary from the initialized status of dead or unnecessary. Later only these phi-function nodes may be included in a pruned SSA control flow representation form.

Figure 4D:
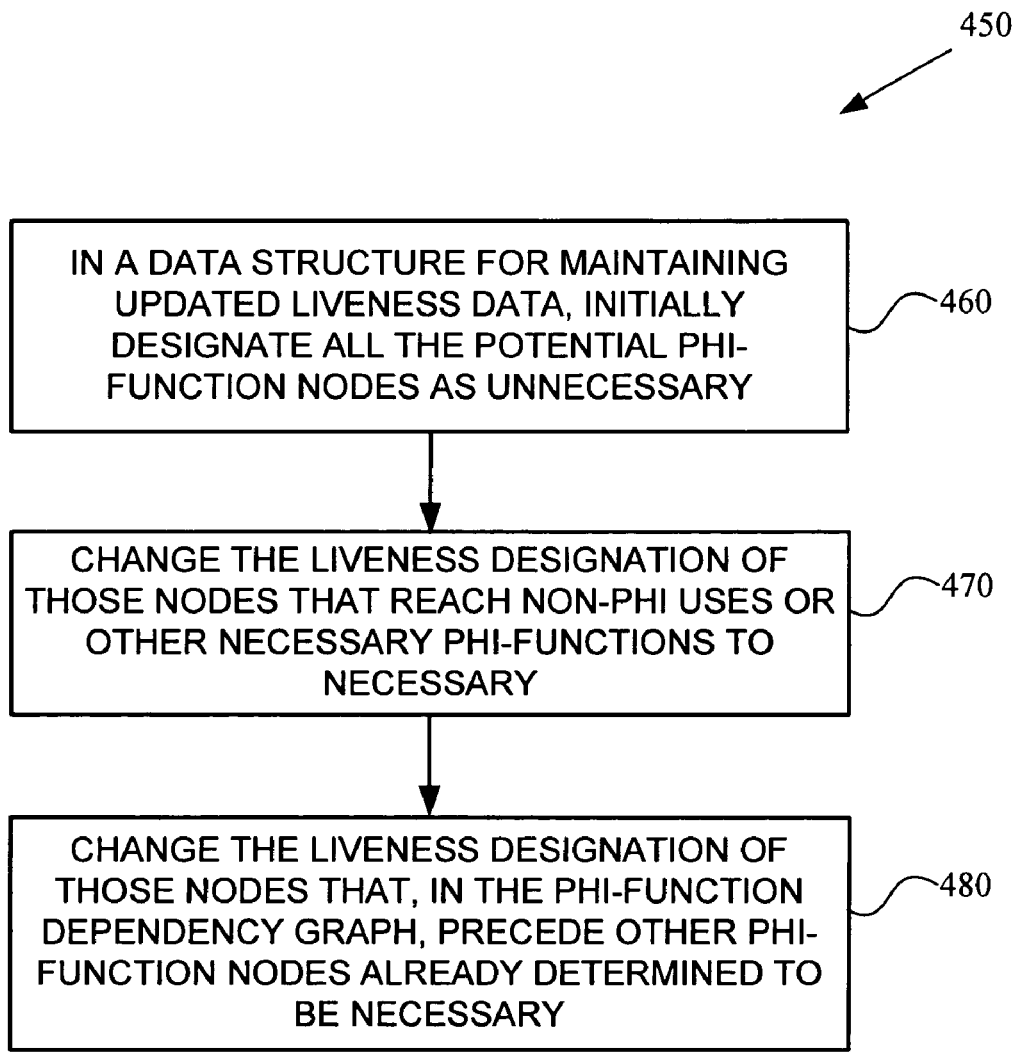
FIG. 4D is a flow diagram describing a method of constructing a fully pruned form of the SSA representation of a computer program wherein all of potentially necessary phi-function nodes are initially assumed to be unnecessary.

The method 450 of FIG. 4D describes one such example of a method of constructing SSA forms wherein initially potential phi-function nodes are assumed to be unnecessary (dead). At 460, for the purposes of the analysis, in a data structure for maintaining liveness information related to the various nodes comprising a control flow epresentation, potential phi-function nodes are initialized to a liveness status of unnecessary (dead). Then at 470, for example, according to the method FIG. 4D, the liveness status of those phi-function nodes with assignments that directly reach non-phi uses or other phi-functions whose liveness status is designated to be necessary may be also be changed to necessary. Also, at 480, after a live-closure process, those phi-function nodes that, according to the phi-function dependency graph, precede (and thus, are otherwise relied on by) nodes currently determined to be necessary may also have their liveness status marked to be necessary.

An Exemplary Overall Method for Generating a Phi-function Dependency Data Structure The method 400 of FIG. 4B at 430 calls for determining relationships between various assignments (including the phi-function assignments) and their respective uses for variables associated with a program. The liveness of some phi-function assignments may be determined by examining if they directly reach a non-phi use or a necessary phi-use, whereas the liveness of some other phi-function assignments may need to be determined based on their dependency relationships with other assignments that directly reach a non-phi use.

Figure 4E:
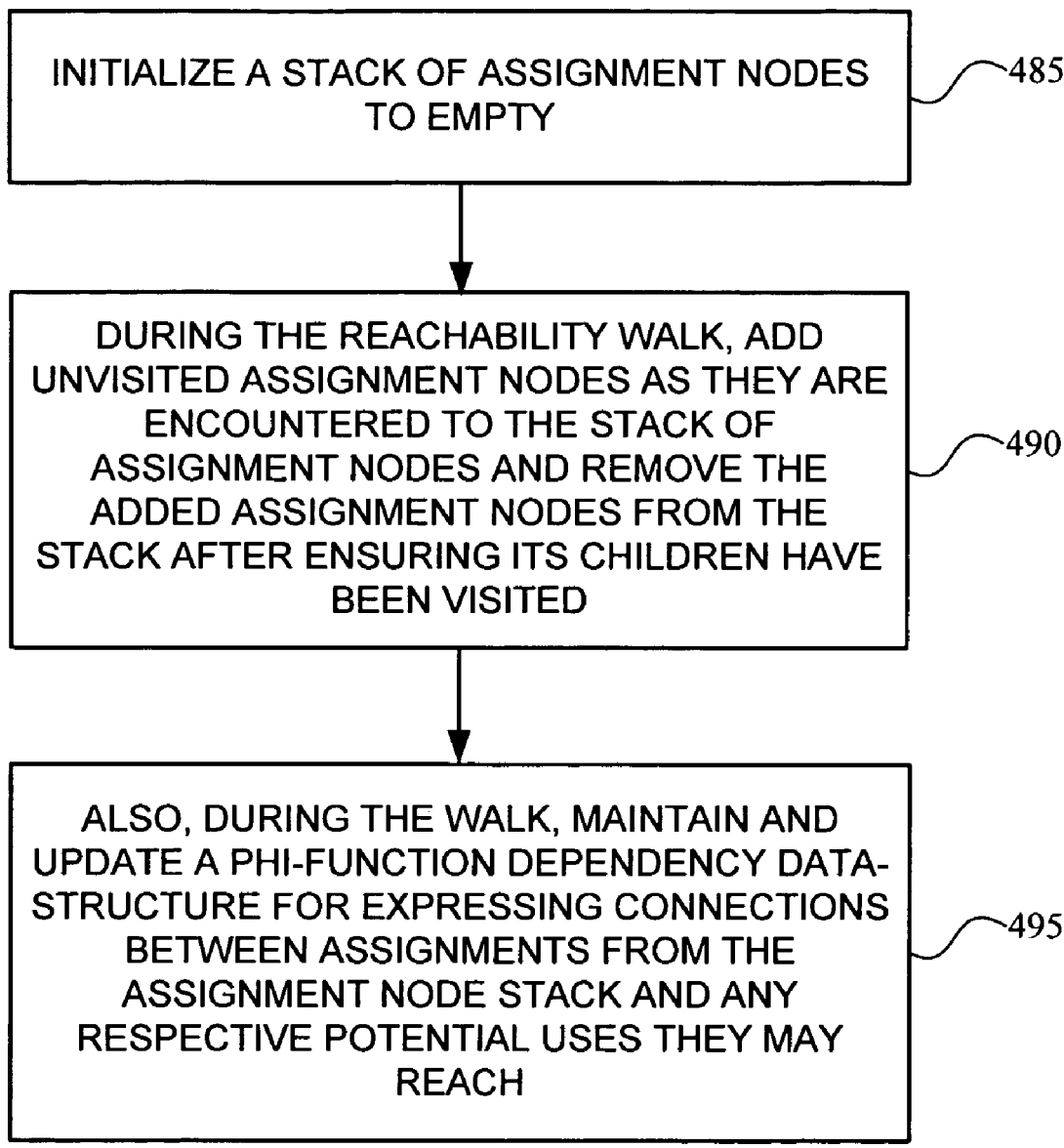
FIG. 4E is a flow diagram describing a method of constructing a phi-function dependency data structure expressing the dependency relationships between the various potentially necessary phi-function nodes.

FIG. 4E describes one example of a method for generating a phi-function dependency graph. During a reachability walk (e.g., a depth first walk) of control flow representation of the original program code, a data structure such as a stack may be updated to identify and record the various assignments that are encountered during the walk. A stack form of data structure may be particularly suitable for this purpose but other forms of data structures may also be used. For multiple variables in a program a different stack may be maintained for each variable of the program.

At 485, an assignment record stack associated with a variable may be first initialized to be empty if it is not already so. At 490, during the reachability walk of a control flow representation related to a program code, data descriptive of an assignment node may be added to the stack. Also, as described at 495, as uses of the subject variable are encountered, a phi-function dependency data structure (e.g., dependency flow graph) may also be constructed by recording edges from nodes on top of the assignment stack to their related subsequent uses reached by the top assignment node on the stack. Later during a live-closure phase (e.g., 440) these edges may be used to determine which of the phi-functions (initially assumed to be dead or unnecessary) may in fact be necessary because of their dependency relationships to other phi-functions that directly reach non-phi uses or necessary phi-uses of the variable in question. Also, at 490, nodes related to assignments may be removed from the stack once it is determined that the particular node in question does not reach a previously unvisited branch of the control flow representation.

A Programmatic Implementation of a Method of Generating a Pruned SSA Form Via Constructing a Phi-function Dependency Graph FIGS. 5A-B illustrate an exemplary programmatic representation of the methods described above with reference FIGS. 4A-E for generating a pruned form of the SSA representation of a program. The implementation illustrated in FIG. 5A is related to implementing a method of generating a pruned SSA form for a single variable related to a program. However, another example discussed below illustrates the same for multiple variables. The implementation as illustrated in FIG. 5A receives indicators of points or nodes of a control flow representation of the original program where phi-functions may potentially be necessary. These may be identified by any method for calculating potential phi-function node placement techniques as recounted above, such as the methods of calculating dominance frontiers of a program's original code. Also, the phi-function nodes identified to be potentially necessary may initially be assumed to be dead or unnecessary for the purposes of the analysis.

Starting at a first node, which typically is the entry block to a control flow representation of a program, an assignment stack (e.g., 490) is maintained and updated by pushing assignment nodes onto the stack at 510 and removing them after the return statement at 515 brings the program execution control back to the "Pop" statement at 520. As the stack grows, edges are added from the top of the stack to subsequent uses at 525. As described above, this part of the process helps construct the phi-function dependency data structure (495). Also, assignments on the stack that directly reach non-phi uses or necessary phi-uses are also marked as necessary by the "mark top(stack) as live" statement at 530 guarded by the "if" statement at 535. Later the liveness information updated during the process (500 of FIG. 5A) of constructing the phi-function dependency graph is used in the live-closure process (FIG. 6 below) along with phi-function dependency information to identify other necessary phi-functions. This process 500 illustrated in FIG. 5A may be recursively called at 540 until the branches of the control flow representation of the program code have been visited at least once. Other non-recursive methods are also possible. The visitation status of each node of the control flow representation may be maintained and updated via the statement at 545.

An Exemplary Method of Conducting a Live-closure Using a Phi-function Dependency Graph As noted above, some of the potentially necessary phi-function nodes may be confirmed to be necessary during the process of generating a phi-function dependency graph (e.g., 500 as described above with reference to FIG. 5A). Based on such updated liveness information and the information related to phi-function dependencies, a live-closure process can be used to determine other phi-function nodes that are necessary for generating a completely pruned SSA form.

In one method shown in FIG. 5B, a data structure may be used to maintain an updated record of phi-function nodes that are determined to be necessary during the reachability walk for constructing a phi-function dependency graph (e.g. 500). A live-closure process may be implemented as shown in FIG. 6 using this data structure with the updated liveness data from the reachability walk and the phi-dependency relationships between the various phi-function nodes. In the implementation of the live-closure process of FIG. 6, the phi-function nodes that are predecessors of those phi-function nodes determined earlier to be necessary according to the phi-function dependency analysis are also now updated in the records to be necessary. The same process may be repeated for each variable of the program. Later a pruned SSA form of a program may be generated by only instantiating those phi-function nodes that are identified to be necessary at the end of the live-closure process.

Figure 7A:
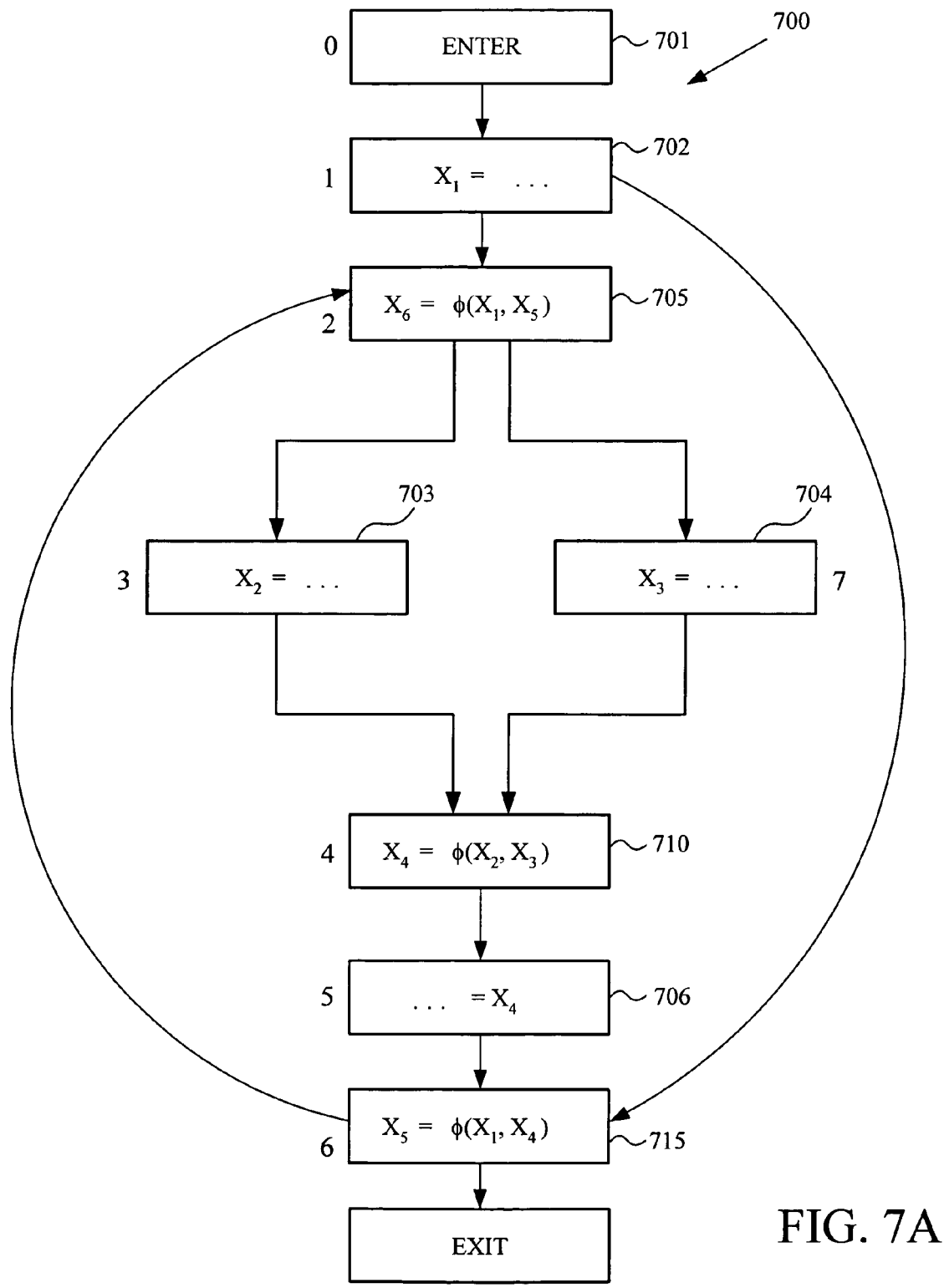
FIG. 7A is a block diagram of an exemplary representation illustrating potentially necessary phi-function nodes, wherein some of the potentially necessary phi-functions may be later determined to be unnecessary.

Example Illustration of Generating a Pruned SSA Form by Identifying Unnecessary Phi-functions FIG. 7A shows an exemplary control flow representation 700 related to a single variable of a program. Analysis of the control flow of the program may identify nodes 2, 4, and 6 (at 705, 710, and 715 respectively) as points where phi-functions may potentially be deemed to be necessary. However, not all such nodes are in reality necessary, which may not become evident without further analysis. Also, in FIG. 7A, for the purposes of illustration, the X variable is shown as having been renamed as in an exemplary SSA form with subscripts (e.g., $X_1$, $X_2$, etc.). This is done for the purpose illustrating the exemplary phi-function analysis and it is not a requirement of the analysis. In fact, renaming of variables to generate an SSA form may be conducted in concurrence with the reachability walk being implemented for the purposes of determining which of potential phi-functions are in fact unnecessary.

Figure 7B:
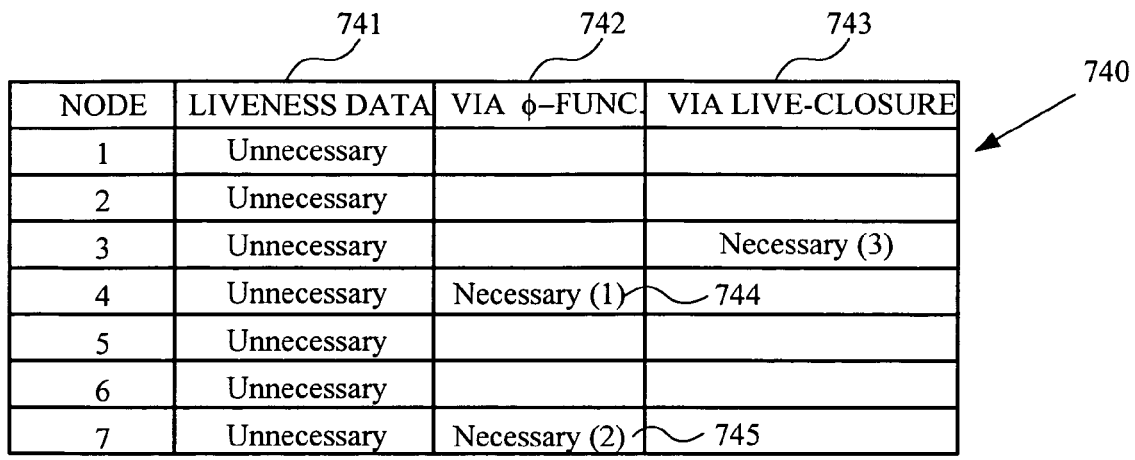
FIG. 7B is a block diagram illustrating status of liveness data related to the nodes of FIG. 7A.

Furthermore, according to one process described above for generating a pruned SSA form, initially, all nodes 1-7 are assumed to not be necessary (dead) for the purposes of analysis. Thus, as illustrated in FIG. 7B, initially, all nodes 1-7 are recorded to be unnecessary at 741. As the process of constructing a pruned SSA form unfolds, the liveness data related to some of the nodes may be changed to necessary. The column 742 illustrates nodes whose liveness data is updated as a result of the initial reachability walk for generating the phi-function dependency graph. The column 743 illustrates nodes that may have their liveness data updated as result of the live-closure phase.

Figure 7C:
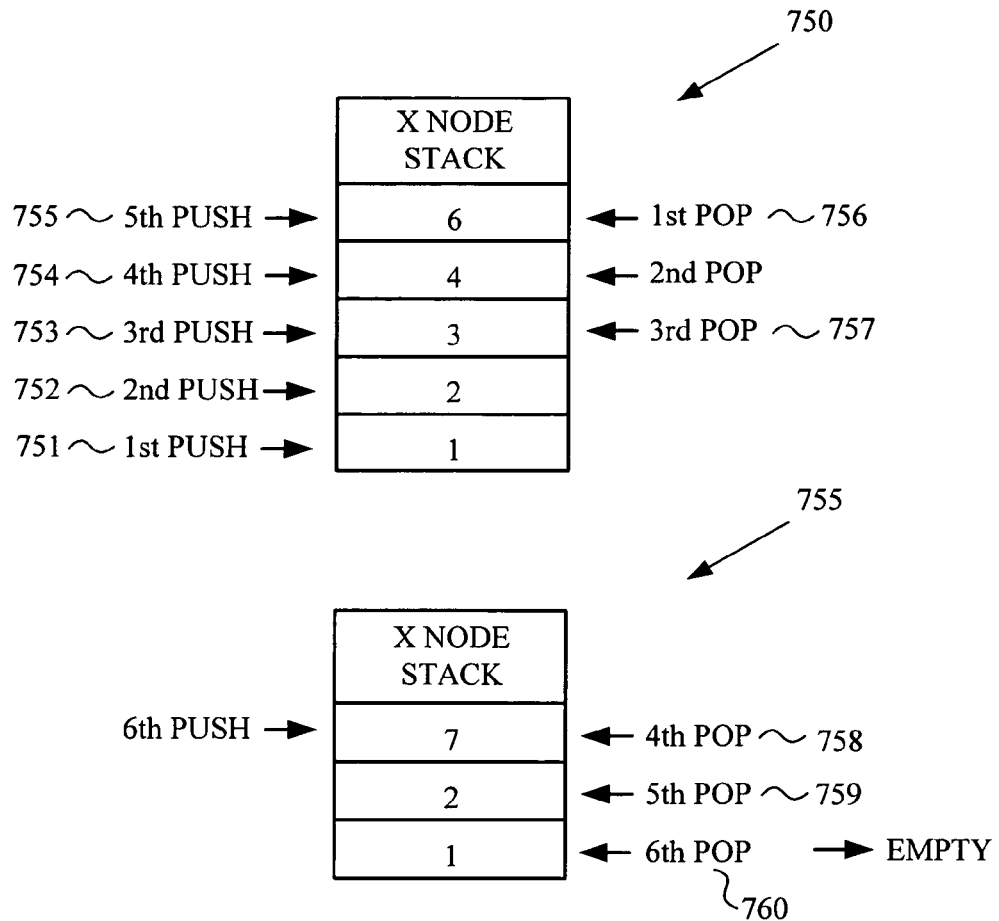
FIG. 7C is a block diagram for illustrating status of an assignment node stack that may be updated during a reachability walk of the program representation of FIG. 7A.

FIG. 7C illustrates exemplary assignment node stacks 750 and 755 for recording assignments encountered during a reachability walk of the control flow representation 700 of FIG. 7A. The stacks 750 and 755 are different views of the same stacks that both relate to the reachability analysis of the control flow representation 700 in FIG. 7A and are shown separately merely to illustrate the status of the stacks during different phases of the analysis. Also during the reachability walk, a data structure such as the one illustrated at FIG. 7D may be maintained to record edges describing dependency relationships between assignment nodes from the stacks 750 and 755 and any subsequent uses encountered further below.

For instance, according to the process 400 of FIG. 4B which is described further via the exemplary programmatic implementation 500 at FIG. 5A, a reachability walk (e.g., depth-first walk) may begin at node 0 at 701. As they are encountered, assignment nodes are pushed onto the assignment node stack at 750 and 755. For instance, with node 1(702) of FIG. 7A as the current node at 501 for the procedure "DFS-SSA-Search(current-node, stack)" 505, node 1(702) is pushed onto the stack at 751 in FIG. 7C based on the push statement 510. Then, at 540 the "DFS-SSA-Search (current-node, stack)" is called again for the control flow successor of node 1(702), which is node 2(705). The potentially necessary phi-function $\phi(X_1, X_5)$ at 705 may also comprise a potential use of the assignment "$X_1 = \ldots$" at node 1(702). Thus, according to the procedure 500 at 525, an edge is added from the top of the stack to the use. In this instance, the top of the stack is node 1 at 751 and the potential use would be the phi-use at 705 (($\phi(X_1, X_5)$)). This edge from node 1(702) to node 2(705) may be recorded at 776 in the exemplary phi-function dependency data structure 755 of FIG. 7D. Node 2(705) is also an assignment node. More particularly, it is a phi-function assignment node. Nevertheless, it is also pushed on the stack next at 752.

Next, the "DFS-SSA-Search(current-node, stack)" 540 procedure is called again for each of the successors of node 2(705), which are nodes 3(703) and 7(704). In the exemplary reachability walk (e.g., depth-first) either node 3(703) or node 7(704) may be chosen. For the purposes of illustration, here in this case node 3(703) may be chosen to be the next current node. As a simple assignment node, node 3(703) is just pushed onto the stack at 753 and no edges are built in this iteration. Next "DFS-SSA-Search(current-node, stack)" 540 procedure is called with the successor node 4(710) as the current node. As before node 4(710) comprises a phi-use. Thus, at 525 an edge is added from the current top of the node stack 550, which is the node 3(703) at 753, and use at node 4(710). This edge may be recorded as shown at 777 in FIG. 7D. Node 4(710) is also pushed onto the stack at 754. Then, the "DFS-SSA-Search(current-node, stack)" 540 procedure is called with current node set to the successor node 5(706), which is a non-phi use of the phi-assignment at node 4(710).

First, an edge is added from the current top of the stack 750, which is node 4 at 754 to the use at node 5(706). This edge from node 4(710) to node 5(706) is added to the dependency data structure 775 at 778. Also, since the use at node 5(706) is not a phi-use (in other words it is a non-phi use) the current top of the stack (node 4 at 710) is marked necessary. The updated liveness data related to node 3(703) is illustrated in FIG. 7B at 744. Since node 5(706) is not an assignment it is not pushed onto the assignment stack 750.

Next, the "DFS-SSA-Search(current-node, stack)" 540 is called with the successor node 6(715) as the current node. Node 6(715) is a phi-function node comprising a phi-use. Thus, at 525 an edge is added to the dependency data structure 775 from the current top of the node stack 750, which is node 4(710), to its corresponding use at node 6(715). Thus, at 779 in FIG. 7D an edge is added from node 4(710) to node 6(715). Since node 6(715) comprises a phi-assignment node 6(715) it is pushed onto the stack at 755. Later at 540, the "DFS-SSA-Search(current-node, stack)" is called with the successor node to node 6(715), which is node 2(705). Node 2(705) is a previously visited phi-function node. Nevertheless, it is a potential use of the potential phi-assignment at node 6(715). Thus, at 780, an edge is added from current top of the stack, the phi-assignment node 6(715), to its subsequent potential phi-use at node 2(705). However, later at 550, the procedure "DFS-SSA-Search(current-node, stack)" 505 begins to unwind through the return statement 515 since node 2(705) was previously visited. At each return, execution control is returned back to the point 540 at the end of the recursively called "DFS-SSA-Search(current-node, stack)" procedure.

Figure 7D:
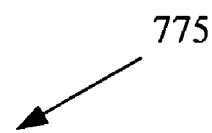
FIG. 7D is a block diagram illustrating an exemplary phi-function dependency data structure constructed during a reachability walk of the control flow representation of FIG. 7A.
Figure 7E:
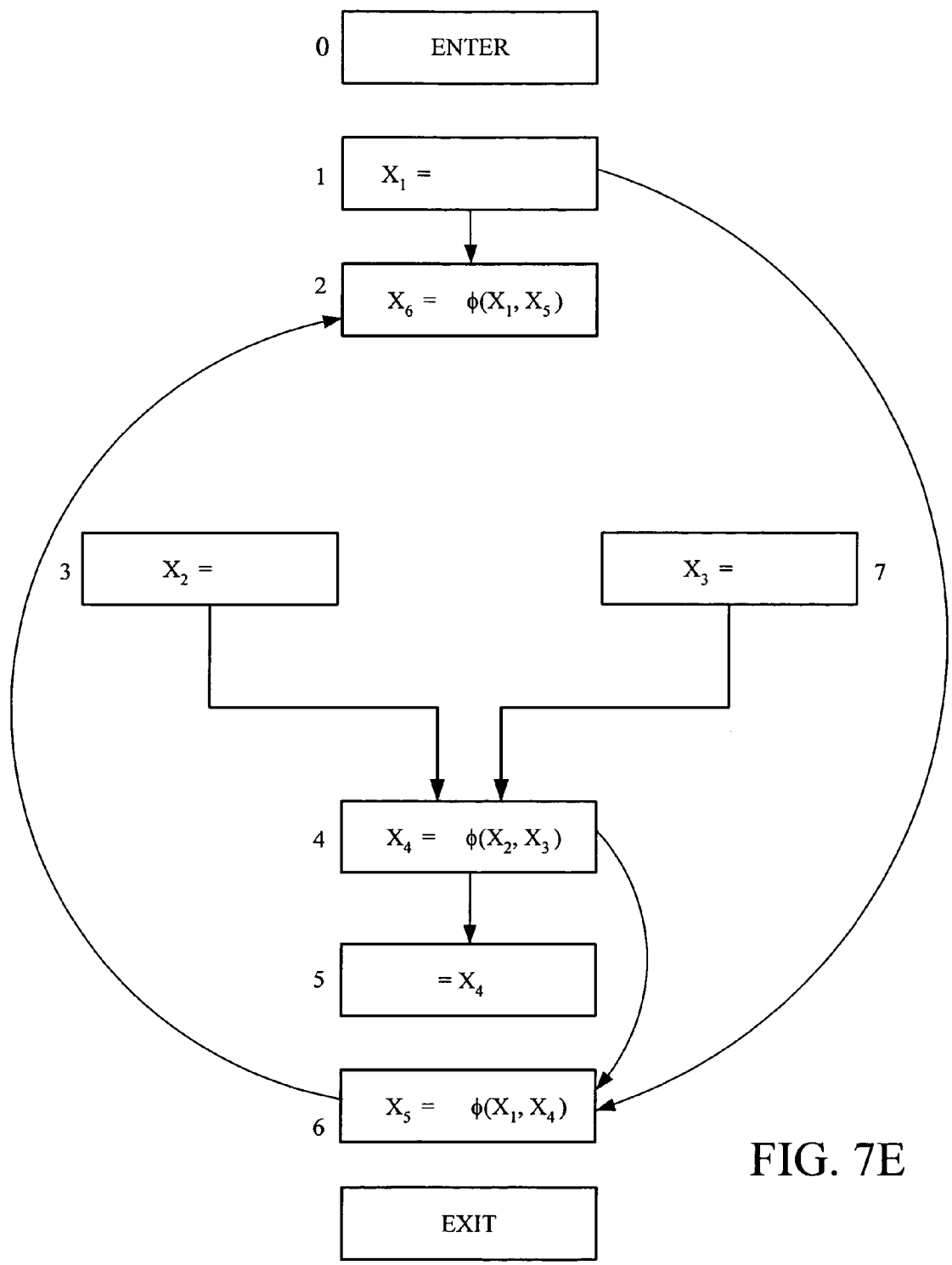
FIG. 7E is a block diagram graphically illustrating the exemplary phi-function dependency data structure of FIG. 7D constructed during a reachability walk of the control flow representation of FIG. 7A.

Each time the return path counters a previously visited assignment node, at 520, it is removed off the stack starting with the node 6(715) being removed at 756. After node 3(703) is removed at 757 control returns back to node 2(705) on the return path. This time the previously unvisited branch comprising node 7(704) is visited by calling the "DFS-SSA-Search(current-node, stack)" with node 7(704) as the current node. Node 7(704) is an assignment node. As a result, node 7(704) is pushed onto the stack at 755 which reflects the state of assignment stack 750 after node 3(703) was removed at 757. The successor node of node 7(704) is the previously visited node 4(710), which is a phi-use node. Thus at 781, an edge is added from node 7(704) which would be the current top of the stack to node 4(710). Also then at 535, the current top of the assignment node stack node 7(704) is updated to a status of necessary, which is indicated at 745 in FIG. 7B. Since node 4(710) is a node that was previously visited, the process begins to unwind again and node 7(704) is removed at 758. Later at 759 node 2(705) is removed off the stack. On a return to node 1(702) the edge leading back to node 6(715) is used and "DFS-SSA-Search(current-node, stack)" procedure is called with node 6(715) as the current node, which is a previously visited phi-function assignment node. As a result, an edge is added from the current top of the node 1(702) to node 6(715). However, since node 6(715) was previously visited it is not pushed onto the stack and the procedure begins to unwind again. During this unwind process, node 1(702) is also removed off the stack 755. With no more nodes to visit, the reachability walk for generating a phi-function dependency graph is complete. The edges of the phi-function dependencies are recorded as shown in FIG. 7D, which may be graphically illustrated as shown in FIG. 7E wherein edges depict dependencies between the various assignments and uses.

During a live-closure process such as the implementation described in FIG. 6, starting with single phi-function node 4(710), whose liveness was updated to be necessary its phi-function dependency predecessors are also changed to a liveness status of necessary. In this case, the predecessors of node 4(710) are nodes 3(777) and 7(781). Among them, node 7(704) has already been marked necessary (at 745). Now as a result of the live-closure process, node 3(703) is also marked necessary. However, neither node 3(703) nor node 7(704) have predecessors in the phi-function dependency data structure 775 of FIG. 7D. Thus, the live-closure process ends.

At the end of live-closure process it can be determined that among three potentially necessary phi-function nodes that were identified earlier (nodes 2, 4 and 6 at 705, 703 and 715 respectively in FIG. 7A) only one, node 4(710) at 744, was found to be necessary. Thus, the optimistic assumption that phi-function nodes are unnecessary was wrong only once in this instance. For this illustrative example, node 4(710) would be the only phi-function node that is included in a fully pruned SSA representation. In this manner, the pruning of the SSA form can allow for simplifying this exemplary form by two unnecessary phi-nodes which can have an enormous impact during a number of other compiler operations such as code optimization.

Figure 8A:
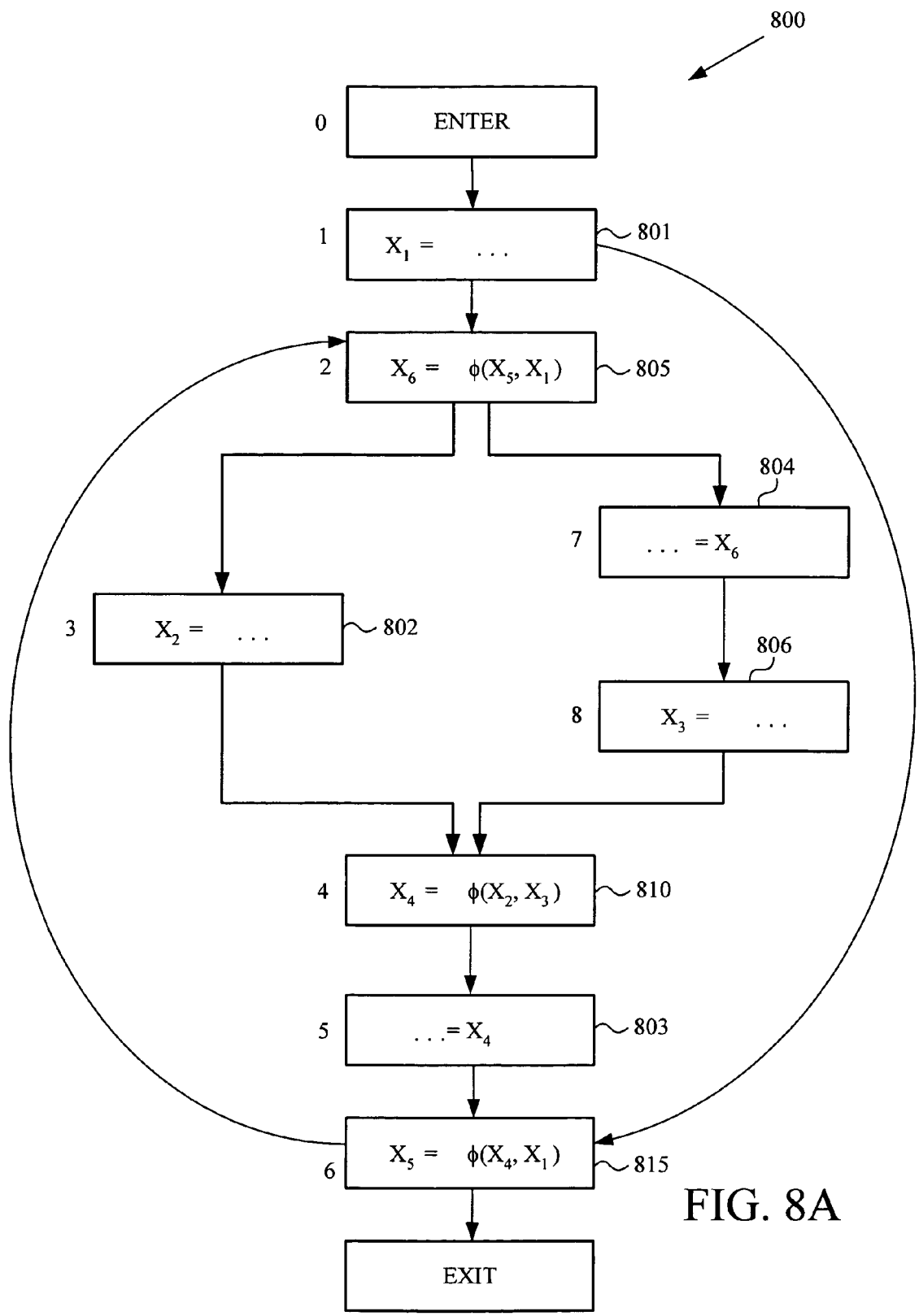
FIG. 8A is a block diagram illustrating an exemplary program representation comprising potentially necessary phi-function nodes, wherein all of the potentially necessary phi-functions may be later determined to be in fact necessary.
Figures 8B, 8C:
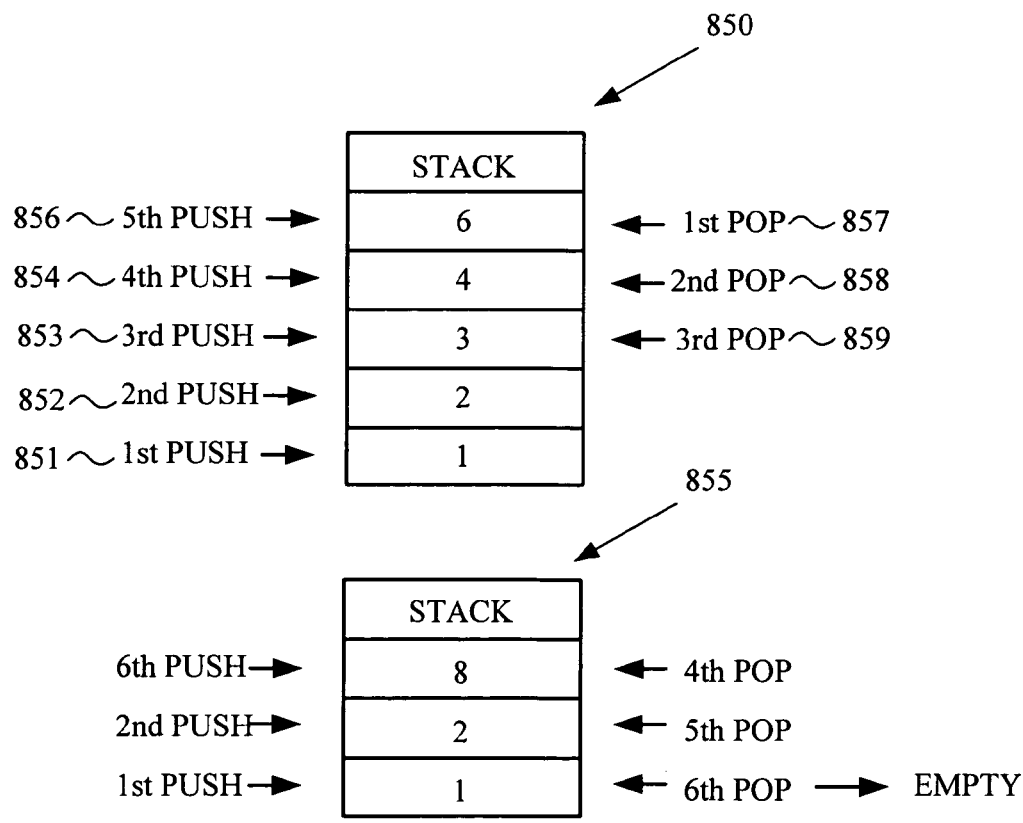
FIG. 8B is a block diagram illustrating status of liveness data related to the nodes of FIG. 8A.
FIG. 8C is a block diagram for illustrating status of an assignment node stack that may be updated during a reachability walk of the program representation of FIG. 8A.

Exemplary SSA Form Wherein All Potential Phi-functions may be Confirmed to be Necessary An analysis of the control flow representation of FIG. 7A determined that only one of the potential phi-function nodes was ultimately determined to be necessary. The rest were determined to be unnecessary and thus, were not included in a pruned SSA form of the program. However, it is possible that methods described above with reference to FIGS. 4A and 5 could confirm that all potential phi-functions may be determined to be ultimately necessary. FIG. 8A illustrates one such example. According to the method 400 of FIG. 4B as further illustrated in FIG. 5A a stack of assignments is maintained and updated as the unpruned SSA form is traversed during a reachability walk. Also, as shown in FIG. 8B, initially all nodes are assumed to be dead or unnecessary for the purposes of the analysis. Furthermore in FIG. 8A, nodes 2, 4, and 6 (at 805, 810 and 815 respectively) are initially identified as potentially necessary phi-function placements.

During the analysis, assignment nodes 1, 2, 3 and 4 at 801, 805, 802 and 810 respectively of FIG. 8A, are pushed or added onto the assignment node stack 850 at 851, 852, 853 and 854 respectively. Also, since nodes 2 and 4 are also phi-use nodes, edges are added from the top of the stack to these uses at 876 and 877 of FIG. 8D. However, since node 5(803), which is a successor node of node 4(810), comprises a non-phi use (as opposed to a phi-use) of the variable X, the node on top of assignment node stack is confirmed to be necessary. Thus, in this case, the liveness data related to node 4(810) is changed to necessary as shown at 845 in FIG. 8B. Also, an edge is added from the current top of the node stack, which is node 4(810), to the current use at node 5(803) at 878. As a result of the phi-assignment at node 6(815), another edge is added from the current top of the stack which is still node 4(810) to the phi-use node 6(815). Later, at 856 phi-assignment node 6(815) is pushed onto the stack at 850. After returning to node 2(805) via node 6(815) another edge is added from the phi-assignment at node 6(815) to phi-use at node 2(805) as shown at 880 in FIG. 8D.

Figure 8D:
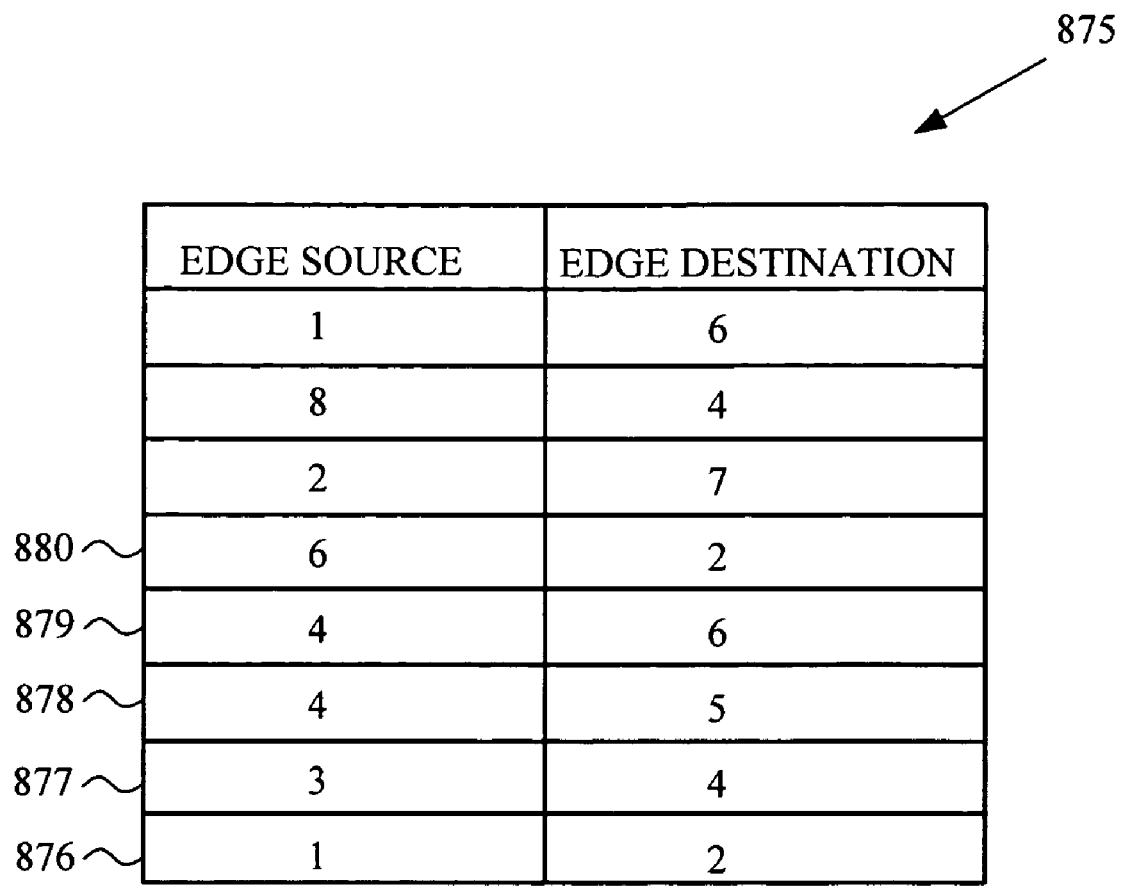
FIG. 8D is a block diagram illustrating an exemplary phi-function dependency data structure constructed during a reachability walk of the program representation of FIG. 8A.

Since node 2(805) was previously visited once, the process begins to unwind while removing assignment nodes (e.g., as shown at 857-859 in FIG. 8C) from the stack until node 2(805) is reached again on the return. Upon return, the procedure "DFS-SSA-Search(current-node, stack)" is called again with node 7(804) as the current node. Node 7(805)

comprises a non-phi use. Thus, the current top of the node stack after unwind, which is node 2(805), may have its liveness data changed at 846 from unnecessary to necessary. Calling "DFS-SSA-Search(current-node, stack)" with the successor of node 7(804), which is node 8(806), as the current node causes node 8(806) to be added onto the stack. However, since node 4(810) was already marked necessary during a previous visit, node 8(806) is marked necessary at 847 according to the condition at 535 in FIG. 5A. Continuing this process, edges are added from node 8(806) to node 4(810) and upon return to node 1(801) an edge is added from node 1(801) to node 6(815). Since there were no more unvisited branches, the dependency data structure 875 is completed as shown in FIG. 8D.

Using the completed dependency data structure 875 and the updated liveness data from 840, the live-closure process may now be implemented. Applying the live-closure process shows that node 6(815) should also have its liveness data updated to necessary at 848 because node 6(815) is a predecessor of the node 2(805) which is now set to a liveness status of necessary. Thus, according to the analysis, now all potentially necessary phi-function nodes (i.e., nodes 2, 4 and 6 at 805, 810 and 815 respectively) are confirmed in fact to be necessary.

Figure 9A:
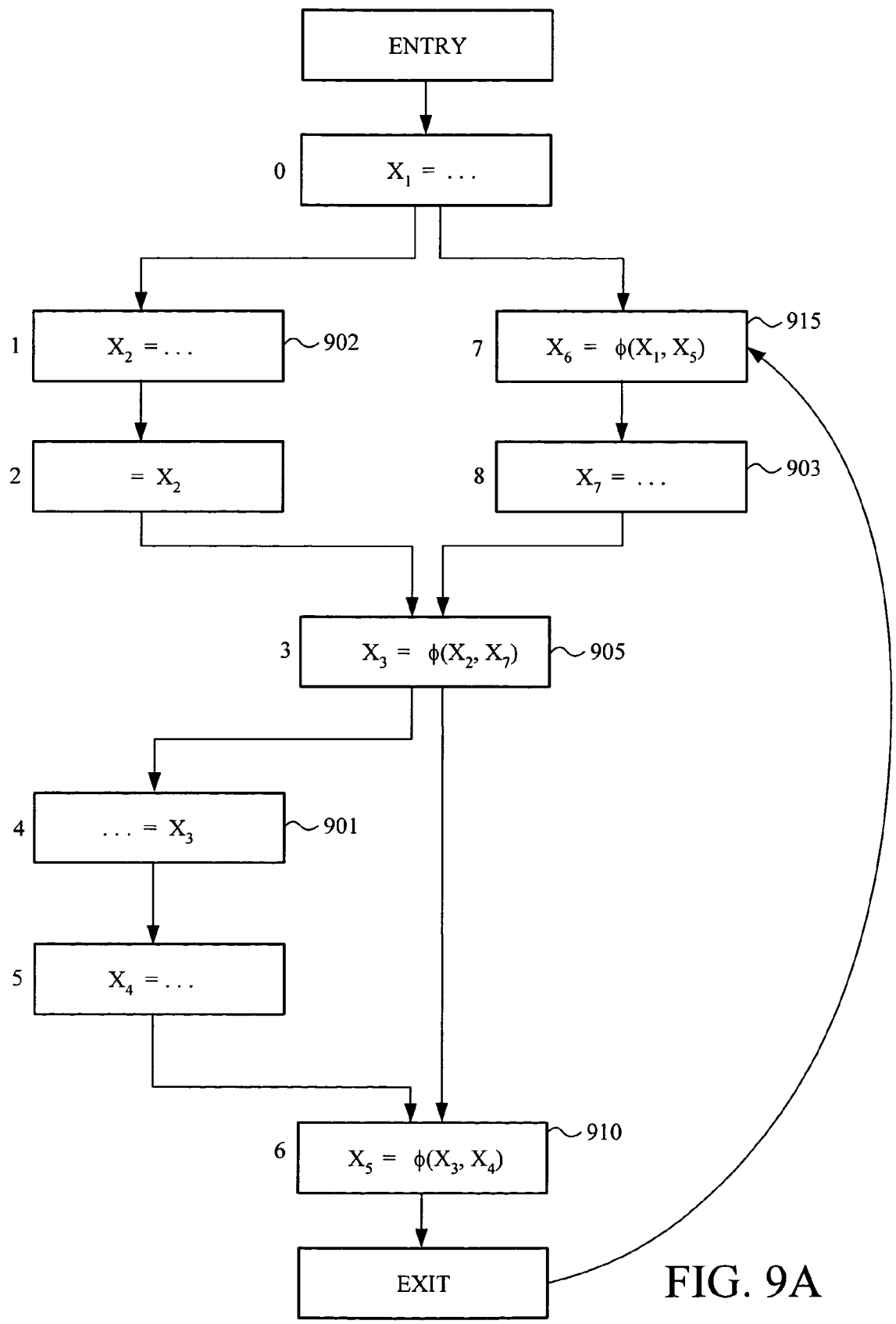
FIG. 9A is a block diagram of an exemplary program representation illustrating potentially necessary phi-function nodes, wherein some of the potentially necessary phi-functions may be later determined to be unnecessary.
Figure 9B:
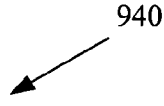
FIG. 9B is a block diagram illustrating status of liveness data related to the nodes of FIG. 9A.
Figure 9C:
FIG. 9C is a block diagram illustrating an exemplary phi-function dependency data structure constructed during a reachability walk of the program representation of FIG. 9A.
Figure 9D:
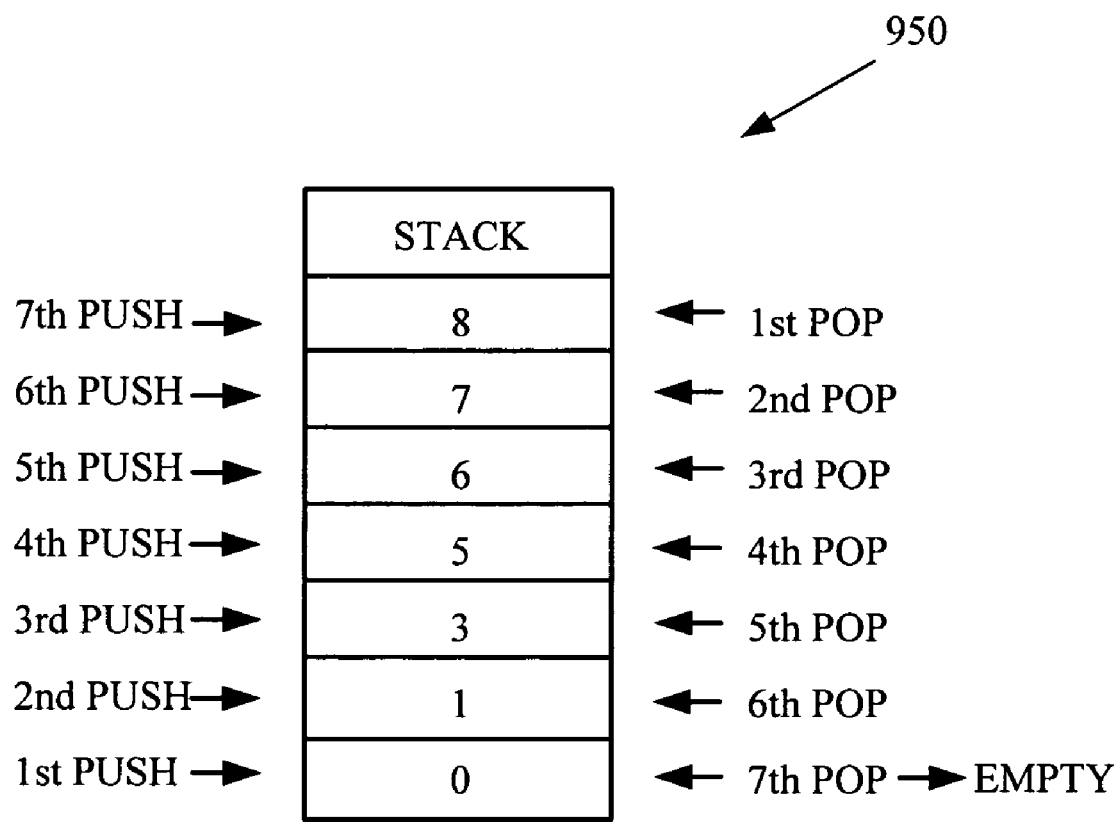
FIG. 9D is a block diagram for illustrating status of an assignment node stack that may be updated during a reachability walk of the program representation of FIG. 9A.

Another Exemplary Pruning of an SSA form wherein Some of the Potential Phi-function Nodes are Confirmed to be Unnecessary FIG. 9A illustrates yet another control flow representation wherein all the potential phi-function nodes have been identified as nodes 3, 6 and 7 at 905, 910 and 915 respectively. As described above, according to the methods described with reference to FIGS. 4A-C and the exemplary implementation as shown in FIG. 5A, a stack of assignment nodes 950 as shown in FIG. 9D is maintained during a reachability walk (e.g., depth-first) of the control representation. Also at 940 in FIG. 9B, the liveness data related to each of the nodes is first assumed to be dead or unnecessary. The phi-function dependency graph may be built via the edges that are maintained as shown at FIG. 9C.

According to the process implemented as shown in FIG. 5A, the non-phi use encountered at node 4(901) causes the liveness data of the top of the assignment node stack, which at the instance would be the phi-function node 3(905) to be changed from unnecessary to necessary as shown at 945. Assignment nodes 1(902) and node 8(903) that are not phi-function assignment nodes may also be updated to a necessary status during the reachability walk phase of the analysis. At the end of the reachability walk a data structure 975 indicating the phi-function dependencies is completed as shown in FIG. 9C.

Later during the live-closure phase, based on the dependencies indicated in the phi-function dependency data structure it can be confirmed that no other potential phi-function node from the control flow representation has a potential assignment that may reach a non-phi use. Node 3(905), which is the only phi-function node whose liveness status is updated to necessary, during the reachability walk, does not have any predecessors in the dependency data structure 975 that is not already marked necessary. As a result, no other phi-function is updated to a necessary status. Thus, in a pruned form of the SSA representation of a program, node 3(905) is the only phi-function node that is included.

Figure 10A:
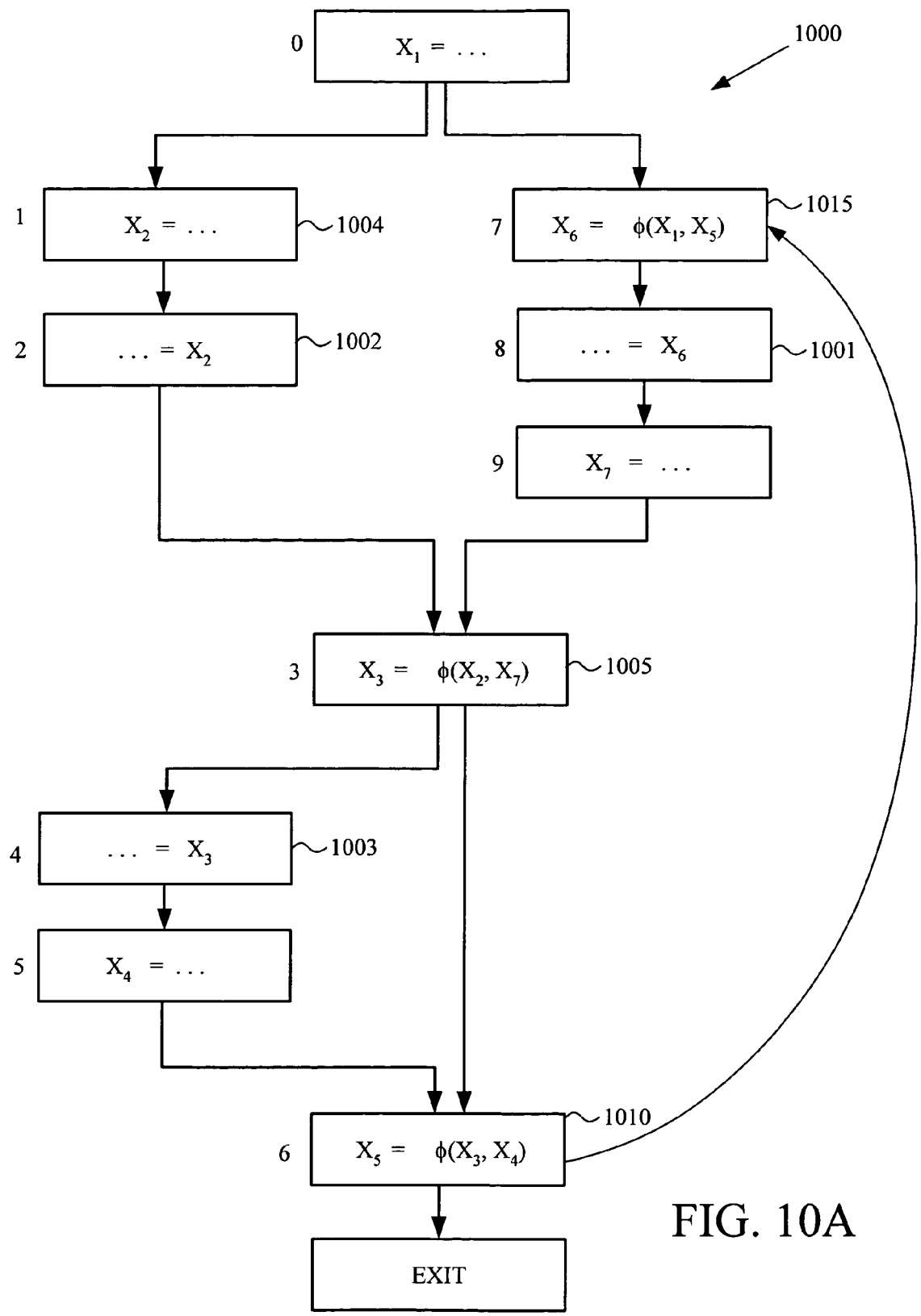
FIG. 10A is a block diagram illustrating an exemplary control flow representation illustrating potentially necessary phi-function nodes, wherein all of the potentially necessary phi-functions may be later determined to be in fact necessary.
Figures 10B, 10C:
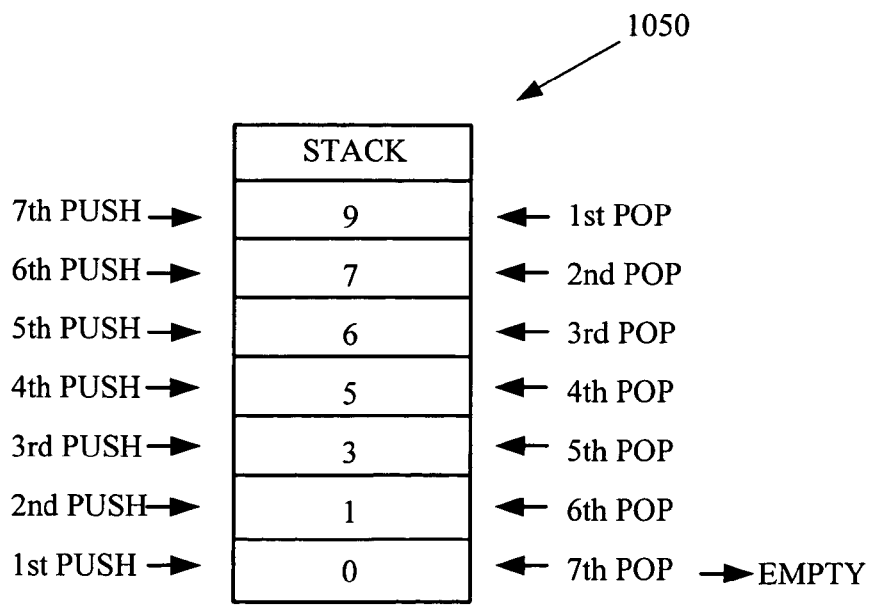
FIG. 10B is a block diagram illustrating status of liveness data related to the nodes of FIG. 10A.
FIG. 10C is a block diagram for illustrating status of an assignment node stack that may be updated during a reachability walk of the program representation of FIG. 10A.
Figure 10D:
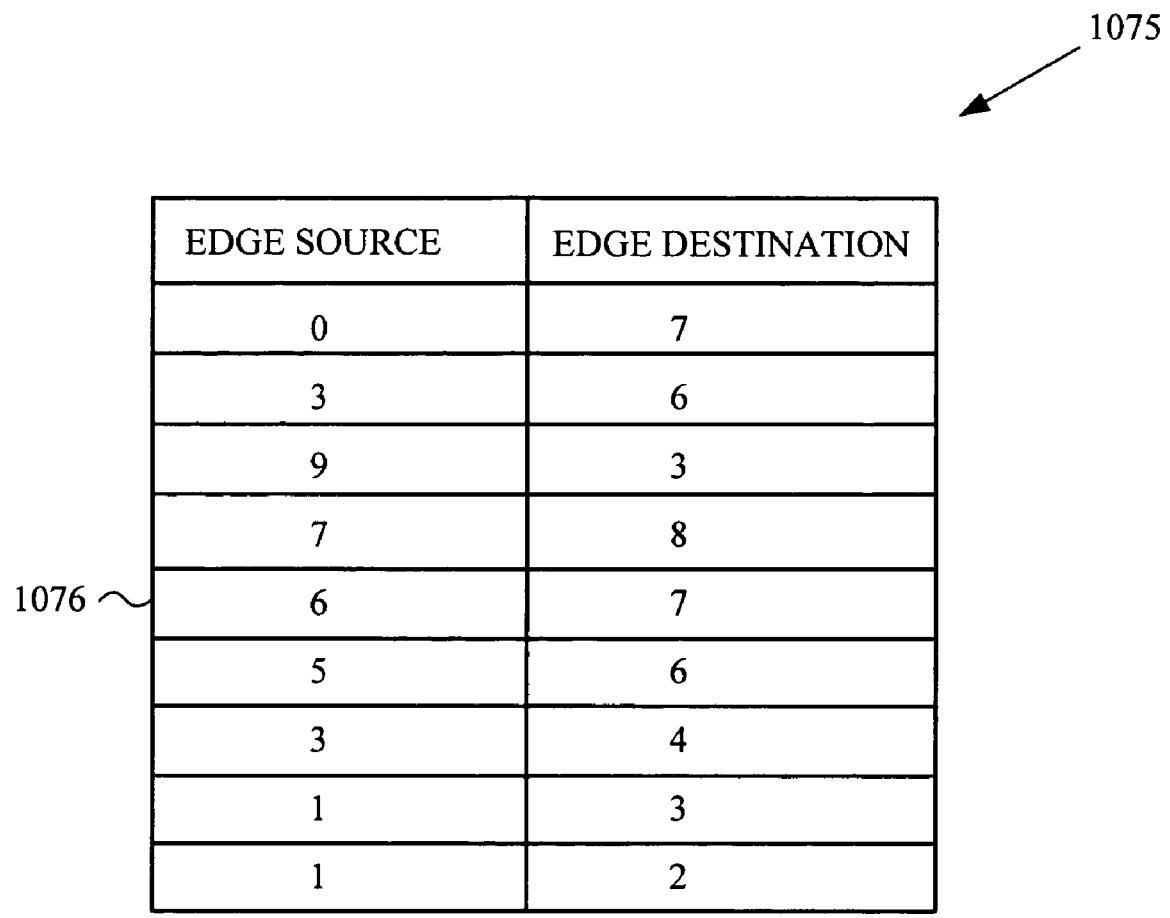
FIG. 10D is a block diagram illustrating an exemplary phi-function dependency data structure constructed during a reachability walk of the program representation of FIG. 10A.

Another Exemplary SSA Representation wherein all the Potential Phi-function Nodes are Confirmed to be Necessary As noted above with reference to FIG. 9A some of the potential phi-function nodes may later be confirmed to be unnecessary. However, a slight change in the program may result in an SSA form wherein all of the potential phi-function nodes are confirmed to be necessary. For instance, as shown in FIG. 10A, adding another non-phi use of the variable X at node 8(1001) could cause all of the potential phi-function nodes 3, 6 and 7 (at 1005, 1010 and 1015 respectively) to in fact be necessary. According to the process described with reference to FIGS. 4A-C and the exemplary implementation in FIGS. 5A-B, a stack of assignment nodes at 1050 in FIG. 10C is maintained while conducting a reachability walk of the control flow representation 1000. The liveness status of the various nodes is updated as shown in FIG. 10B and edges between the changing top of node stack to current nodes that relate to uses are maintained as shown in FIG. 10D to generate a phi-function dependency data structure 1075.

As result of the non-phi uses of variable X at nodes 2 and 4 at 1002 and 1003 respectively, nodes 1 and 3 at 1004 and 1005 respectively, will have their liveness status updated to necessary as shown at 1041 and 1042 respectively. Node 7(1015) is also changed to a liveness status of necessary at 1043 in FIG. 10B. Meanwhile, edges are added to complete the dependency data structure 1075 during the reachability walk of the analysis. As shown in FIG. 10B, phi-assignment nodes 3(1005) and 7(1010) are confirmed to be necessary during the reachability walk since they directly reach non-phi uses at 1003 and 1001 respectively. Also, during the walk it is established that the phi-function node 6(1010) is a predecessor of node 7(1015) at 1076. Thus, during the live-closure process phi-function assignment at node 6(1010) is also updated to a liveness status of necessary as shown at 1044. This is so because the analysis shows that any potential assignment at the phi-function assignment node 6(1010) may reach a non-phi use via another phi-function assignment node 7(1015). In this case all nodes initially identified as being potentially necessary phi-function nodes are confirmed to be necessary. As a result, pruning of the SSA form in this instance does not remove any phi-function assignments.

An Exemplary Implementation of the Method of Constructing Pruned SSA Forms for Multiple Variables FIG. 11 illustrates an implementation of the methods described with reference to FIG. 4A-E for generating a pruned SSA representation for programs with multiple variables. Generally, in a multiple variable scenario, instead of recording assignment nodes for a single variable, assignments related to each of the multiple variables may be recorded. Also, the dependencies between assignments and uses are recorded for each of the multiple variables. Furthermore, the live-closure process is also conducted with reference to each of the multiple variables comprising a program. The procedure "DFS-SSA-Search(current-node, stacks)" at 1100 for multiple variable scenario as shown in the FIG. 11 records assignments related to each of the multiple variables and generates a phi-function dependency graph with edges recording the various dependencies between assignments and uses for each of the multiple variables. Similarly, the live-closure process described above for the single variable scenario (FIG. 5B) may be implemented using like principles for a multiple variable scenario as well.

Figure 12A:
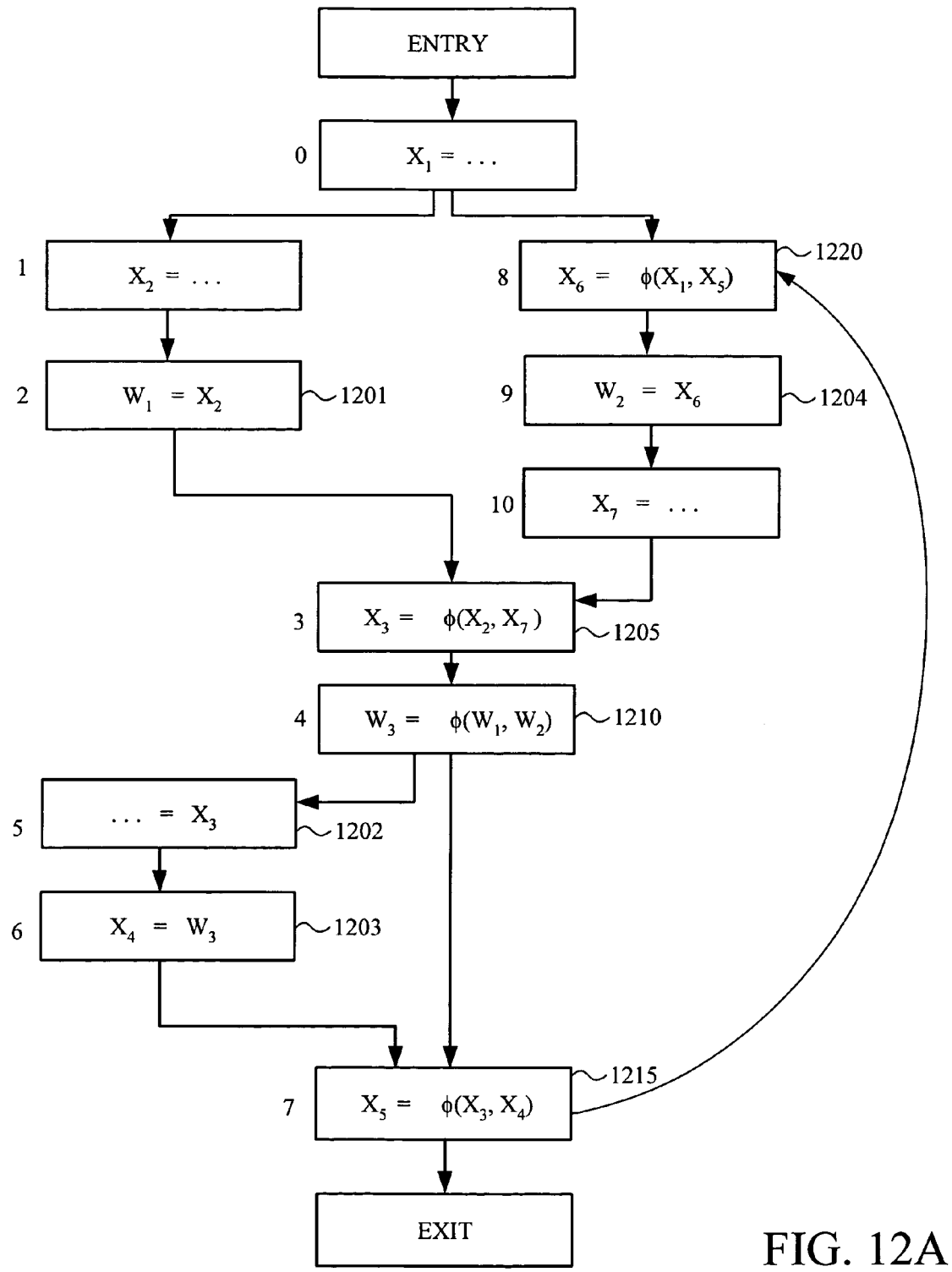
FIG. 12A is a block diagram illustrating an exemplary program representation illustrating potentially necessary phi-function for multiple variables, wherein all of the potentially necessary phi-functions may be later determined to be in fact necessary.
Figures 12B, 12C, 12D:
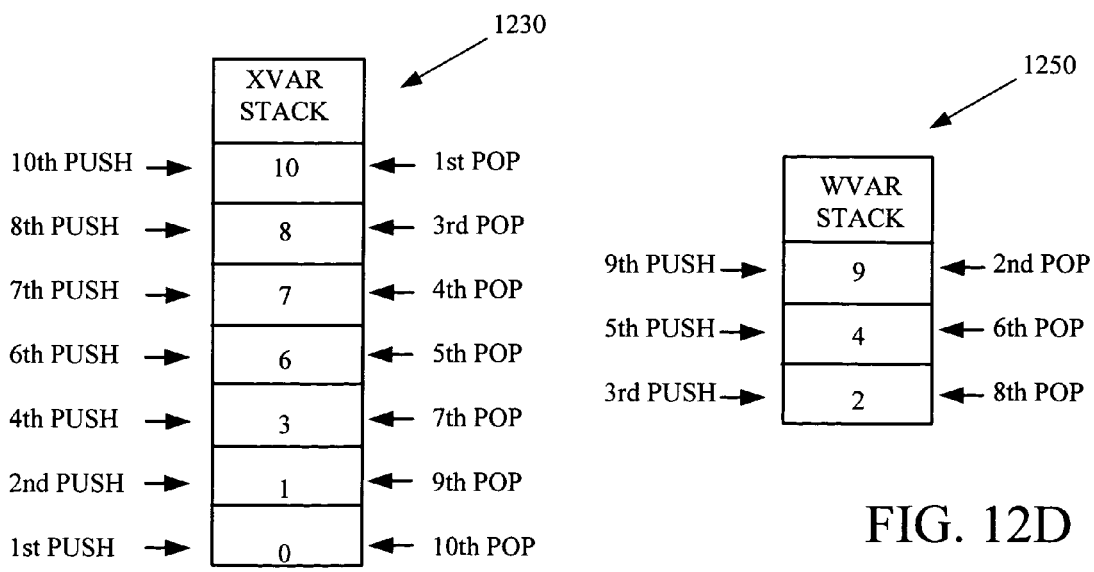
FIG. 12B is a block diagram illustrating status of liveness data related to the nodes of FIG. 12A.
FIG. 12C is a block diagram for illustrating status of an assignment node stack for the variable "X" that may be updated during a reachability walk of the program representation of FIG. 12A.
FIG. 12D is a block diagram for illustrating status of an assignment node stack for the variable "W" that may be updated during a reachability walk of the program representation of FIG. 12A.

FIG. 12A illustrates an exemplary SSA representation for a program with multiple variables (e.g., variables X and W). In this multiple variable scenario, some of the nodes may comprise assignments and uses related to both of the variables X and W. For instance, node 2(1201) represents an assignment with respect to variable W but it also represents a use of the variable X. FIGS. 12C and 12D show the multiple node stacks that may be used to record assignments related to each of the variables X and W. In this example, two separate stacks one 1230 for variable X and one 1250 for variable W are used. Also, as shown in FIGS. 12E and 12F, edges will be recorded between assignments and subsequent related uses for each of the variables X and W.

During the initial reachability walk analysis, according to the exemplary implementation 1100 at FIG. 11, nodes are added to each of the assignment stacks 1230 and 1250 appropriately as assignment nodes are encountered. The liveness status of each of the nodes is initially recorded to be dead or unnecessary as shown in FIG. 12B and changed as the analysis unfolds. Initially, a calculation of a dominance frontier may determine potential phi-function nodes to be located at nodes 3, 4, 7 and 8 at 1205, 1210, 1215 and 1220 respectively. During the reachability walk according to the process 1100, it can be determined that the non-phi use of variable X at node 5(1202) is reached by the phi-assignment at node 3(1205). Thus, at 1241 the liveness status of node 5(1202) is updated to necessary.

Similarly, with respect to variable W, it can be determined that the phi-assignment at node 4(1210) reaches the non-phi use at node 6(1203), which can result in node 4(1210) to be listed as necessary at 1242. Also, the phi-function assignment related to variable X at node 8(1220) is determined to reach a non-phi use at node 9(1204), which can cause it now to be listed as necessary at 1243. Thus, at the end of the reachability walk, the phi-function nodes 3(1205), 4(1210) and 8(1220) are determined to be necessary. Also, the dependency relationships between the various assignments and their uses are recorded. The completed data structure for recording the respective edges between the various assignment and use nodes may be as shown in FIGS. 12E and 12F.

Figure 12E:
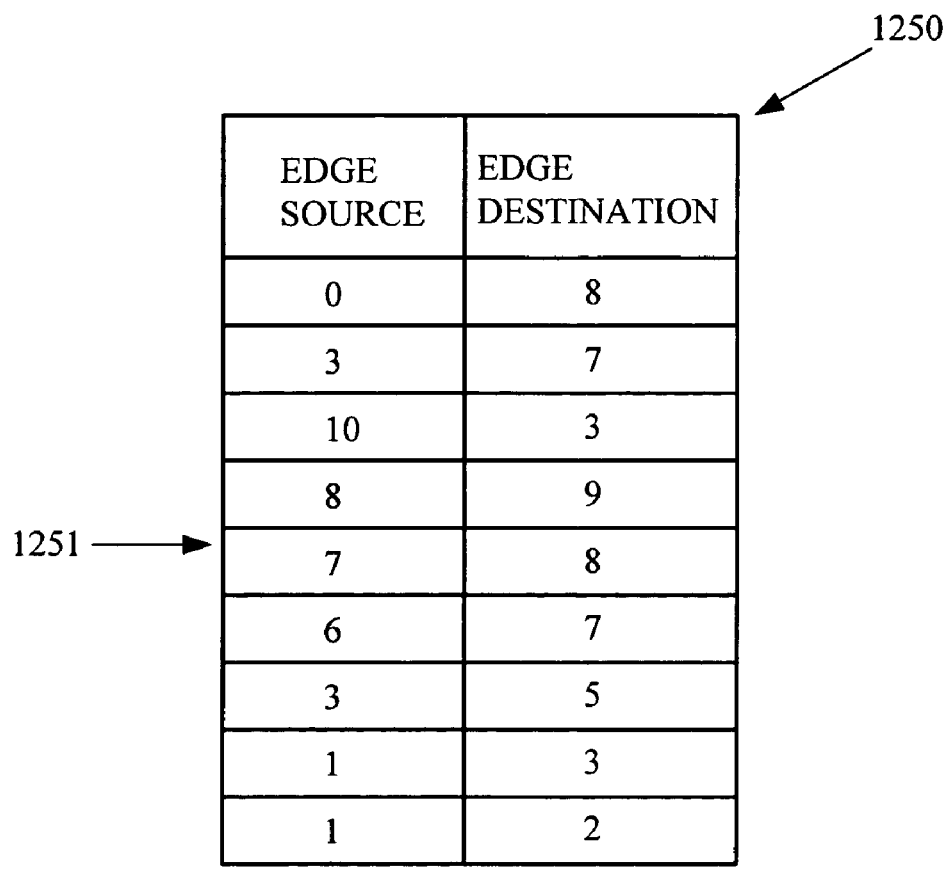
FIG. 12E is a block diagram illustrating an exemplary phi-function dependency data structure for the variable "X" constructed during a reachability walk of the program representation of FIG. 12A.
Figure 12F:
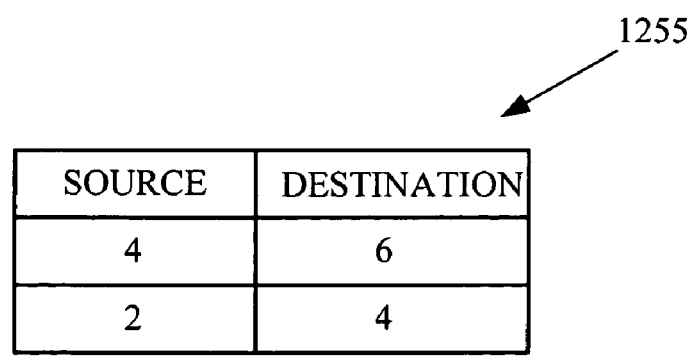
FIG. 12F is a block diagram illustrating an exemplary phi-function dependency data structure for the variable "W" constructed during a reachability walk of the program representation of FIG. 12A.

During the live-closure process, the updated liveness data 1240 and the corresponding dependency data from FIGS. 12E and 12F may be used to determine which of the potentially necessary phi-functions may be confirmed to be necessary as a result of their dependency relationship to other phi-functions. For instance, during the live-closure process related to variable X, node 7(1215) which was initially assumed to be dead or unnecessary may be changed to a liveness status of necessary because node 7(1215) is discovered to be a predecessor of node 8(1220) as shown in FIG. 12E at 1251. Thus, if node 8(1220) is determined to be necessary, then so should the phi-function at node 7(1215). In this example, at the end of the live-closure process all the potentially necessary phi-function nodes were confirmed to be indeed necessary.

Exemplary Advantages

The methods of constructing a pruned SSA form discussed above present several advantages. For one, the process can dependably yield a fully pruned SSA without the need for a traditional pre-pass full liveness analysis (e.g., via a backward walk) requiring multiple passes over the control flow representations of the original code (e.g., as used in Choi et al.) Also, the renaming phase of constructing an SSA form may be concurrently implemented with the reachability walk (e.g., a forward walk) phase described above for confirming which among the potentially necessary phi-function nodes are indeed necessary. As a result, the methods described above can be much less computationally expensive than the other known methods of constructing a pruned SSA form. Also, unlike the methods of constructing semi-pruned SSA forms, the methods described above can result in the unnecessary phi-function nodes being identified accurately.

The following table illustrates that the results of one exemplary implementation of the novel methods described above result in significant improvement in the processing time required to generate a pruned SSA form when compared to the methods of Choi, et. al.

TABLE 1

Comparison with Choi et al.

| Program | Number of functions | Technique A | Technique B | Percent Improvement |
| --- | --- | --- | --- | --- |
| Program 1 | 15066 | 0.8 | 1.091 | 36.375 |
| Program 2 | 0419 | .586 | .783 | 33.6177 |
| Program 3 | 9044 | .512 | .689 | 34.5703 |
| Program 4 | 14349 | .931 | 1.208 | 29.753 |
| Program 5 | 17203 | .913 | 1.253 | 37.2399 |
| Program 6 | 19070 | 1.042 | 1.434 | 37.62 |
| Program 7 | 6839 | .632 | .817 | 29.2722 |
| Program 8 | 12998.57 | .773714 | 1.039286 | 34.3242 |

As table 1 shows, results of test conducted on a computer equipped with a Pentium® 4 2.6 gigahertz processor running a number of programs. Technique A generated a pruned SSA form via a technique based on that shown in FIG. 5A and did not involve a full liveness analysis (i.e., only a single forward pass was performed). Further, technique A included an optimistic assumption that phi nodes with unknown status could be removed. Technique B generated a pruned SSA form using the technique described in section 5.1 of Choi et al., including a traditional liveness analysis (e.g., a backward walk) which requires multiple passes over the flow graph. The processing time for generating a pruned SSA form using technique A was on the average about 34 percent faster than the processing time required to generate the same pruned SSA form using the methods of Choi, et al.

Exemplary Computing Environment

Figure 13:
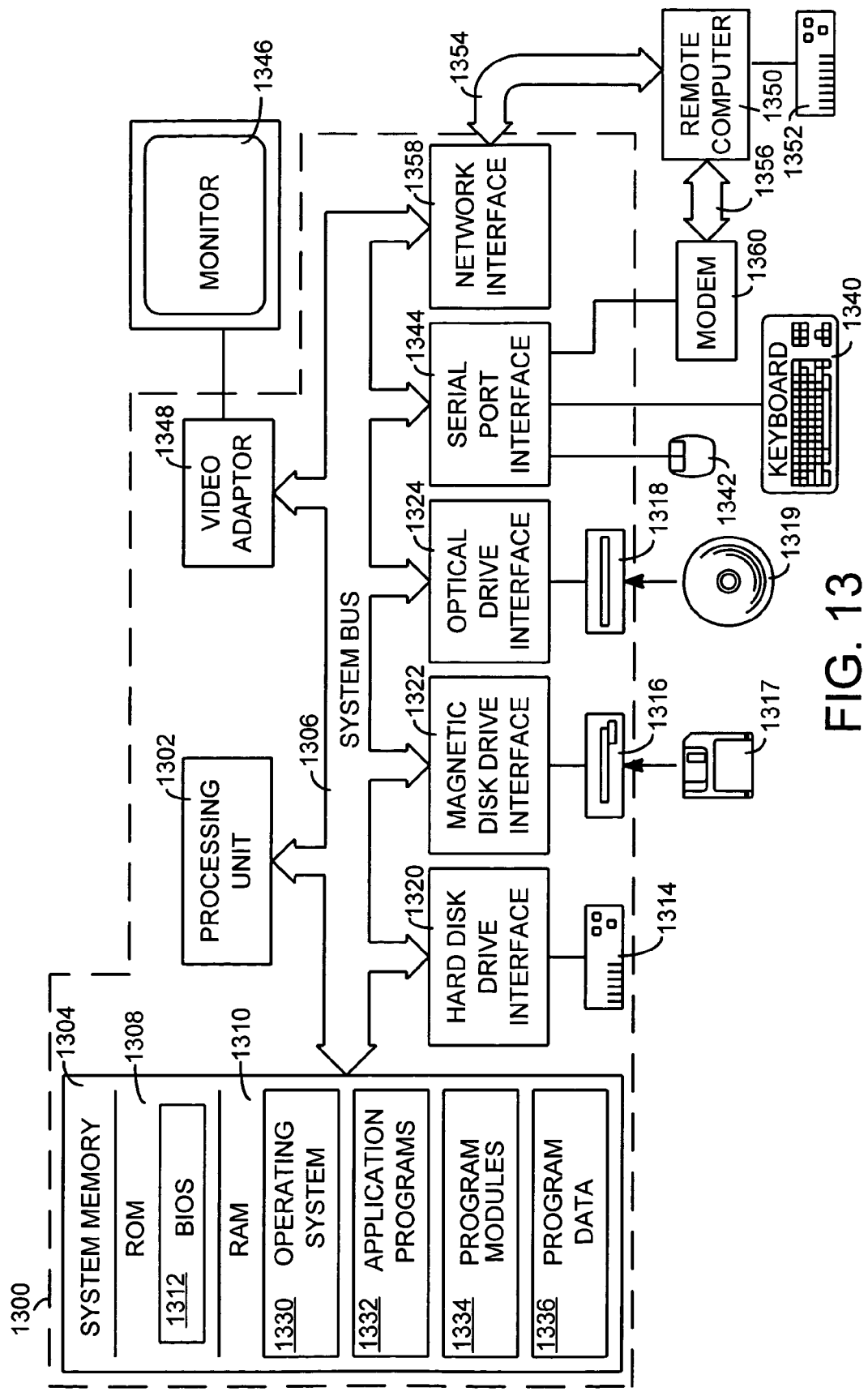
FIG. 13 is a diagram depicting a general-purpose computing device constituting an exemplary system for implementing the disclosed technology.

FIG. 13 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 13, an exemplary system for implementing the disclosed technology includes a general purpose computing device in the form of a conventional PC 1300, including a processing unit 1302, a system memory 1304, and a system bus 1306 that couples various system components including the system memory 1304 to the processing unit 1302. The system bus 1306 may be any of several types of bus structures including a memory bus or memory controller, a peripheral bus, and a local bus using any of a variety of bus architectures. The system memory 1304 includes read only memory (ROM) 1308 and random access memory (RAM) 1310. A basic input/output system (BIOS) 1312, containing the basic routines that help with the transfer of information between elements within the PC 1300, is stored in ROM 1308.

The PC 1300 further includes a hard disk drive 1314 for reading from and writing to a hard disk (not shown), a magnetic disk drive 1316 for reading from or writing to a removable magnetic disk 1317, and an optical disk drive 1318 for reading from or writing to a removable optical disk 1319 (such as a CD-ROM or other optical media). The hard disk drive 1314, magnetic disk drive 1316, and optical disk drive 1318 are connected to the system bus 1306 by a hard disk drive interface 1320, a magnetic disk drive interface 1322, and an optical drive interface 1324, respectively. The drives and their associated computer-readable media provide nonvolatile storage of computer-readable instructions, data structures, program modules, and other data for the PC 1300. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 1317, optical disk 1319, ROM 1308, or RAM 1310, including an operating system 1330, one or more application programs 1332, other program modules 1334, and program data 1336. A user may enter commands and information into the PC 1300 through input devices such as a keyboard 1340 and pointing device 1342 (such as a mouse). Other input devices (not shown) may include a digital camera, microphone, joystick, game pad, satellite dish, scanner, or the like. These and other input devices are often connected to the processing unit 1302 through a serial port interface 1344 that is coupled to the system bus 1306, but may be connected by other interfaces such as a parallel port, game port, or universal serial bus (USB). A monitor 1346 or other type of display device is also connected to the system bus 1306 via an interface, such as a video adapter 1348. Other peripheral output devices, such as speakers and printers (not shown), may be included.

The PC 1300 may operate in a networked environment using logical connections to one or more remote computers, such as a remote computer 1350. The remote computer 1350 may be another PC, a server, a router, a network PC, or a peer device or other common network node, and typically includes many or all of the elements described above relative to the PC 1300, although only a memory storage device 1352 has been illustrated in FIG. 13. The logical connections depicted in FIG. 13 include a local area network (LAN) 1354 and a wide area network (WAN) 1356. Such networking environments are commonplace in offices, enterprise-wide computer networks, intranets, and the Internet.

When used in a LAN networking environment, the PC 1300 is connected to the LAN 1354 through a network interface 1358. When used in a WAN networking environment, the PC 1300 typically includes a modem 1360 or other means for establishing communications over the WAN 1356, such as the Internet. The modem 1360, which may be internal or external, is connected to the system bus 1306 via the serial port interface 1344. In a networked environment, program modules depicted relative to the personal computer 1300, or portions thereof, may be stored in the remote memory storage device. The network connections shown are exemplary, and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles. For instance, potentially necessary phi-functions may be identified by any method. Also, many suitable data structures such as stacks or tables have been described above for illustrating the principles of the SSA form pruning methods. However, the particular form and combination of data structures are merely illustrative examples and do not limit what is claimed below.

It should also be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media (e.g., Compact Disk, Floppy Disk, Hard Disk, Memory etc.), comprising computer-executable instructions for performing such actions. Elements of the illustrated embodiment shown in software may be implemented in hardware and vice versa.

Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. A method of generating a pruned static single assignment representation of a computer program, the method comprising:
   receiving data indicative of potentially necessary phi-function nodes;
   implementing an optimistic assumption that phi-function nodes are not necessary by initially marking nodes with unknown status as unnecessary;
   during a forward reachability walk of a control flow representation of the computer program, determining phi-function nodes whose assignments reach non-phi uses as necessary;
   during the forward reachability walk of a control flow representation of the computer program, determining other phi-function nodes that are relied on by the phi-function nodes whose assignments reach non-phi uses as necessary;
   and constructing a pruned static single assignment representation of the computer program by including only those phi-function nodes that are determined to be necessary in the static single assignment representation.

2. The method of claim 1, wherein determining the phi-function nodes whose assignments reach non-phi uses comprises: maintaining a record of the phi-function assignments encountered during a reachability walk of a control flow representation of the computer program; and upon reaching a non-phi use, determining which of the previously encountered phi-function assignments it relies on.

3. The method of claim 1, wherein determining the other phi-function nodes that are relied on by the phi-function nodes whose assignments reach non-phi uses comprises: maintaining a record of the phi-function assignments encountered during a reachability walk of a control flow representation of the computer program; upon encountering a necessary phi-function node, determining which of the previously encountered assignments it relies on.

4. The method of claim 1, wherein determining the other phi-function nodes that are relied on by the phi-function nodes whose assignments reach non-phi uses comprises: determining relationships between phi-function nodes by constructing a phi-function dependency data structure comprising representations of dependency relationships between phi-function nodes.

5. The method of claim 4, wherein the phi-function dependency data structure comprises: edges from the phi-function nodes comprising a potential assignment related to one or more variables of the computer program to the phi-function nodes comprising a potential use of the one of the one or more variables.

6. The method of claim 4, wherein determining the other phi-function nodes further comprises: conducting a live-closure of the phi-function dependency data structure.

7. The method of claim 1, wherein the forward reachability walk is a depth-first walk.

8. The method of claim 1, wherein determining which of the potentially necessary phi-function nodes are necessary comprises: determining those potentially necessary phi-function nodes whose assignments reach a necessary phi-function node or a non-phi use of one or more variables of the computer program.

9. The method of claim 1, wherein determining which of the potentially necessary phi-function nodes are necessary comprises: constructing a phi-function dependency data structure comprising representations of dependency relationships between the potentially necessary phi-function nodes.

10. The method claim 9, wherein constructing the phi-function dependency data structure comprises: maintaining a record of assignment nodes encountered during the forward reachability walk; and recording edges from the recorded assignments nodes to nodes comprising a use of the one of one or more variables of the computer program.

11. The method of claim 9, wherein determining which of the potentially necessary phi-function nodes are necessary further comprises: completing a live-closure of the phi-function dependency data structure wherein the potentially necessary phi-function nodes identified in the phi-function dependency data structure as predecessors of phi-functions previously determined to be necessary are also determined to be necessary.

12. The method of claim 1, further comprising maintaining a data structure comprising liveness status of the potentially necessary phi-function nodes, wherein the liveness status associated with the potentially necessary phi-function nodes is initially recorded as unnecessary and updated when the potentially necessary phi-function nodes are determined to be necessary.

13. At least one computer-readable medium having stored thereon computer-executable instructions for performing the method of claim 1.

14. In a computer system comprising a complier program for compiling computer programs a method of generating a pruned static single assignment representation of the computer program, the method comprising:

receiving data related to potentially necessary phi-function nodes;

initializing liveness status of the potentially necessary phi-function nodes as unnecessary;

constructing a phi-function dependency graph for determining phi-functions whose assignments reach non-phi uses and for determining other phi-function nodes that are relied on by the phi-function nodes whose assignments reach non-phi uses, the construction comprising:

during a forward reachability walk, changing the liveness status to neccessary for those potentially necessary phi-function nodes comprising:

the phi-function nodes whose assignments reach non-phi uses and the other phi-function nodes that are relied on by the phi-function nodes whose assignments reach non-phi uses;

and constructing a pruned static single assignment representation of the computer program by including only those phi-function nodes that are determined to be necessary in the static single assignment representation.

15. The method of claim 14, further comprising changing the liveness status to necessary for those potentially necessary phi-function nodes that are identified in the phi-function dependency graph as predecessors of necessary phi-function nodes.

16. The method of claim 14, wherein constructing the phi-function dependency graph comprises: recording edges from the potentially necessary phi-function nodes comprising a potential assignment associated with one or more variables of the computer program to the potentially necessary phi-function nodes comprising a potential use of the one or more variables.

17. The method of claim 1, wherein determining phi-function nodes whose assignments reach non-phi uses further comprises marking the phi-function nodes whose assignments reach non-phi uses as necessary; wherein determining other phi-function nodes that are relied on by the phi-function nodes whose assignments reach non-phi uses further comprises marking the other phi-function nodes that are relied on by the phi-function nodes whose assignments reach non-phi uses as necessary; and further comprising not including the nodes marked as unnecessary in the static single assignment representation of the computer program.

* * * * *